United States Patent [19]

Murakami et al.

[11] Patent Number: 5,231,482
[45] Date of Patent: Jul. 27, 1993

[54] IMAGE FILING APPARATUS AND METHOD FOR THEREBY ENCODING AND STORING VARIOUS DOCUMENTS

[75] Inventors: Tatsuya Murakami, Tachikawa; Eiichi Hadano, Hachioji; Masaaki Fujinawa, Tokyo; Hiromichi Fujisawa, Tokorozawa; Hidefumi Masuzaki; Tsugio Takahashi, both of Hadano; Kazunori Kinoshita, Odawara; Yasuo Kurosu, Yokosuka; Satoshi Ito, Odawara, all of Japan

[73] Assignee: Hitachi, Ltd., Tokyo, Japan
[21] Appl. No.: 761,770
[22] PCT Filed: Dec. 13, 1990
[86] PCT No.: PCT/JP90/01630
§ 371 Date: Aug. 15, 1991
§ 102(e) Date: Aug. 15, 1991
[87] PCT Pub. No.: WO91/09488
PCT Pub. Date: Jun. 27, 1991

[30] Foreign Application Priority Data

Dec. 15, 1989 [JP] Japan .................................. 1-323719
Jul. 24, 1990 [JP] Japan .................................. 2-197489

[51] Int. Cl.⁵ .............................................. H04N 1/46
[52] U.S. Cl. ........................................ 358/75; 358/80
[58] Field of Search ................................... 358/75–80; 355/202–204

[56] References Cited

U.S. PATENT DOCUMENTS 4,307,415 12/1981 Sundermeyer et al. .............. 358/80
4,682,215 7/1987 Adachi .................................... 358/75
4,750,044 6/1988 Nakajima ............................ 358/280

FOREIGN PATENT DOCUMENTS 0251278 6/1987 European Pat. Off. .
62-092070 4/1987 Japan .

Primary Examiner—Stephen Brinich
Attorney, Agent, or Firm—Antonelli, Terry, Stout & Kraus

[57] ABSTRACT

An image filing apparatus and method for receiving as multivalue data an image corresponding to a document, converting the data to binary image data and storing the binary image data. According to the features of the present invention, pixels of that portion of an input image corresponding to a particular color are extracted, and luminance data expressing monochromatic binary image data and binary image data designating colored portions are stored in different planes. Not only black pixels but also pixels expressed in a particular color such as red are described in the plane for the luminance data. Pixels having a particular color to be expressed in "red" such as red characters are extracted and recorded as "1" in another particular color plane, for example, in R-plane different from the luminance plane. The R-plane is recorded with binary image data; only pixels written in "red" are expressed as "1" there and other pixels as "0". When outputted, the pixels in which the contents of the luminance plane are "1" and the contents of the R-plane are "0" are displayed in black and the pixels in which the contents of the R-plane are "1" are displayed in red.

44 Claims, 33 Drawing Sheets

FIG. 2

| COLOR OF INPUT IMAGE | Y | R | COLOR OF OUTPUT IMAGE ||
|---|---|---|---|---|
| | | | MONOCHROMATIC OUTPUT | COLOR OUTPUT |
| WHITE | 0 | 0 | WHITE | WHITE |
| BLACK | 1 | 0 | BLACK | BLACK |
| RED | 1 | 1 | BLACK | RED |

FIG. 4

| COLOR OF INPUT IMAGE | Y | R | B | COLOR OF OUTPUT IMAGE ||
|---|---|---|---|---|---|
| | | | | MONOCHROMATIC OUTPUT | COLOR OUTPUT |
| WHITE | 0 | 0 | 0 | WHITE | WHITE |
| BLACK | 1 | 0 | 0 | BLACK | BLACK |
| RED | 1 | 1 | 0 | BLACK | RED |
| BLUE | 1 | 0 | 1 | BLACK | BLUE |

FIG. 6

| COLOR OF INPUT IMAGE | R | G | B |
|---|---|---|---|
| BLACK | 0 | 0 | 0 |
| BLUE | 0 | 0 | 1 |
| GREEN | 0 | 1 | 0 |
| SKY BLUE | 0 | 1 | 1 |
| RED | 1 | 0 | 0 |
| PURPLE | 1 | 0 | 1 |
| YELLOW | 1 | 1 | 0 |
| WHITE | 1 | 1 | 1 |

FIG. 10

| MODE | DATA-1 | DATA-2 | DATA-3 | DATA-4 |
|---|---|---|---|---|
| I | Y | — | — | — |
| II | Y | R | — | — |
| III | G | R | B | — |
| IV | G | R | B | F cm |

FIG. 11

| MODE | IDENTIFYING CODE ||
|---|---|---|
| I | 0 | 0 |
| II | 0 | 1 |
| III | 1 | 0 |
| IV | 1 | 1 |

FIG. 12

| MODE | Fcm | Frb | Fdm | DATA-1 | DATA-2 | DATA-3 | DATA-4 |
|---|---|---|---|---|---|---|---|
| I | — | — | O | Gc | — | — | — |
|   |   |   | 1 | Gd | — | — | — |
| II | — | O | O | Gc | O | — | — |
|   |   |   | 1 | Gd | O | — | — |
|   |   | 1 | O | Gc | Gc | — | — |
|   |   |   | 1 | Gd | Gd | — | — |
| III | O | — | O | Gc | Gc | Gc | — |
|   |   | — | 1 | Gd | Rd | Bd | — |
|   |   | 1 | — | Gd | Rd | Bd | — |
| IV | O | — | O | Gc | O | O | O |
|   |   |   | 1 | Gd | Rd | Bd | 1 |
|   |   | 1 | — | Gd | Rd | Bd | 1 |

FIG. 13

| MODE | REGION DESIGNATION | CODE | | | |
|---|---|---|---|---|---|
| I | CHARACTERS | 0 | 0 | 0 | 0 |
| I | PHOTOGRAPH | 0 | 0 | 0 | 1 |
| I | MIXED | 0 | 0 | 1 | 0 |
| II | CHARACTERS | 0 | 1 | 0 | 0 |
| II | PHOTOGRAPH | 0 | 1 | 0 | 1 |
| II | MIXED | 0 | 1 | 1 | 0 |
| III | PHOTOGRAPH | 1 | 0 | 0 | 1 |
| III | MIXED | 1 | 0 | 1 | 0 |
| IV | PHOTOGRAPH | 1 | 1 | 0 | 1 |
| IV | MIXED | 1 | 1 | 1 | 0 |

FIG. 14

| MODE | Fcm | Frb | DATA-1 | DATA-2 | DATA-3 | DATA-4 |
|------|-----|-----|--------|--------|--------|--------|
| I    | —   | —   | Gc     | —      | —      | —      |
| II   | —   | 0   | Gc     | 0      | —      | —      |
| II   | —   | 1   | Gc     | Gc     | —      | —      |
| III  | 0   | —   | Gc     | Gc     | Gc     | —      |
| III  | 1   | —   | Gd     | Rd     | Bd     | —      |
| IV   | 0   | —   | Gc     | 0      | 0      | 0      |
| IV   | 1   | —   | Gd     | Rd     | Bd     | 1      |

FIG. 15

| MODE | Fcm | Frb | DATA-1 | DATA-2 | DATA-3 | DATA-4 |
|------|-----|-----|--------|--------|--------|--------|
| I    | —   | —   | Gd     | —      | —      | —      |
| II   | —   | 0   | Gd     | 0      | —      | —      |
| II   | —   | 1   | Gd     | Gd     | —      | —      |
| III  | —   | —   | Gd     | Rd     | Bd     | —      |
| IV   | —   | —   | Gd     | Rd     | Bd     |        |

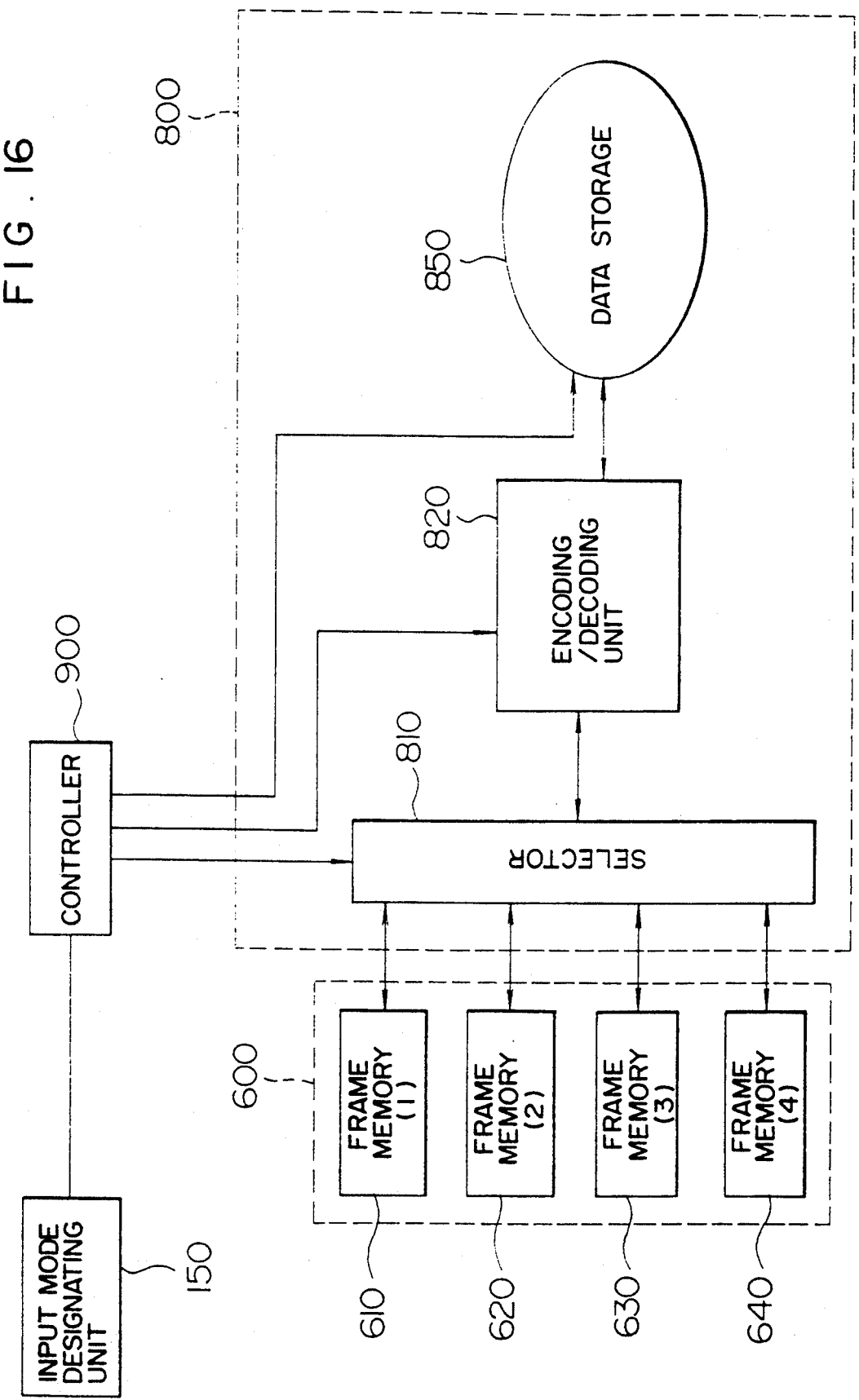

FIG. 19

| MODE | DISPLAY | DATA-1 | DATA-2 | DATA-3 | DATA-4 | DATA-R | DATA-G | DATA-B |
|------|---------|--------|--------|--------|--------|--------|--------|--------|
| I | MONO-CHROME | 0 | — | — | — | 1 | 1 | 1 |
| | | 1 | — | — | — | 0 | 0 | 0 |
| II | MONO-CHROME | 0 | — | — | — | 1 | 1 | 1 |
| | | 1 | — | — | — | 0 | 0 | 0 |
| | COLOR | 0 | 0 | — | — | 1 | 1 | 1 |
| | | 1 | 0 | — | — | 0 | 0 | 0 |
| | | 1 | 1 | — | — | 1 | 0 | 0 |
| III | MONO-CHROME | 0 | — | — | — | 0 | 0 | 0 |
| | | 1 | — | — | — | 1 | 1 | 1 |
| | COLOR | 0 | 0 | 0 | — | 0 | 0 | 0 |
| | | 0 | 0 | 1 | — | 0 | 0 | 1 |
| | | 0 | 1 | 0 | — | 1 | 0 | 0 |
| | | 0 | 1 | 1 | — | 1 | 0 | 1 |
| | | 1 | 0 | 0 | — | 0 | 1 | 0 |
| | | 1 | 0 | 1 | — | 0 | 1 | 1 |
| | | 1 | 1 | 0 | — | 1 | 1 | 0 |
| | | 1 | 1 | 1 | — | 1 | 1 | 1 |
| IV | MONO-CHROME | 0 | — | — | — | 0 | 0 | 0 |
| | | 1 | — | — | — | 1 | 1 | 1 |
| | COLOR | 0 | — | — | 0 | 0 | 0 | 0 |
| | | 1 | — | — | 0 | 1 | 1 | 1 |
| | | 0 | 0 | 0 | 1 | 0 | 0 | 0 |
| | | 0 | 0 | 1 | 1 | 0 | 0 | 1 |
| | | 0 | 1 | 0 | 1 | 1 | 0 | 0 |
| | | 0 | 1 | 1 | 1 | 1 | 0 | 1 |
| | | 1 | 0 | 0 | 1 | 0 | 1 | 0 |
| | | 1 | 0 | 1 | 1 | 0 | 1 | 1 |
| | | 1 | 1 | 0 | 1 | 1 | 1 | 0 |
| | | 1 | 1 | 1 | 1 | 1 | 1 | 1 |

FIG. 22

|   | IDENTFYING SIGNAL | | | CONTENTS OF OUTPUT | |
|---|---|---|---|---|---|
|   | FB/W | FLGR | FLGB | MEMORY 620 | MEMORY 630 |
| 1 | 0 | 0 | 0 | 0 | 0 |
| 2 | 1 | 0 | 0 | 0 | 0 |
| 3 | 1 | 1 | 0 | 1 | 0 |
| 4 | 1 | 0 | 1 | 0 | 1 |

FIG. 23A
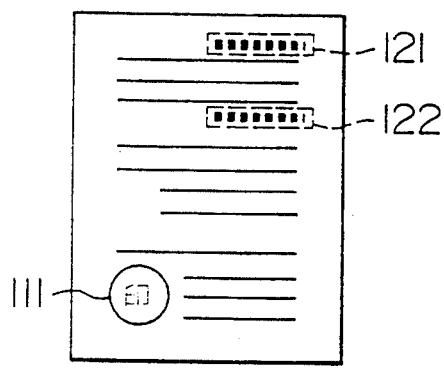
FIG. 23B  FIG. 23C  FIG. 23D
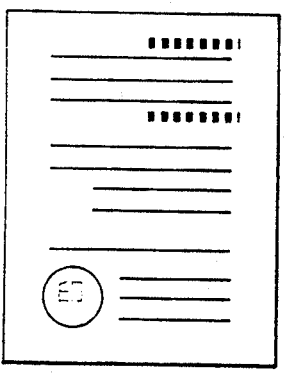 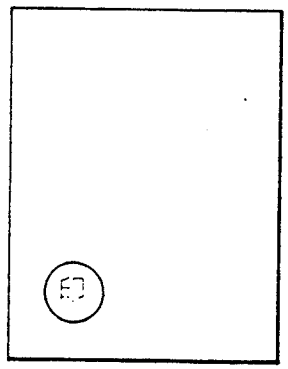 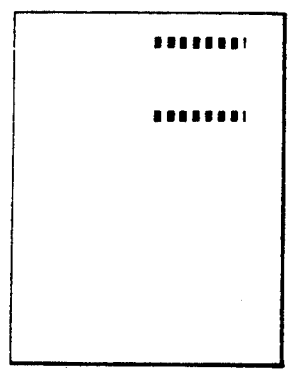

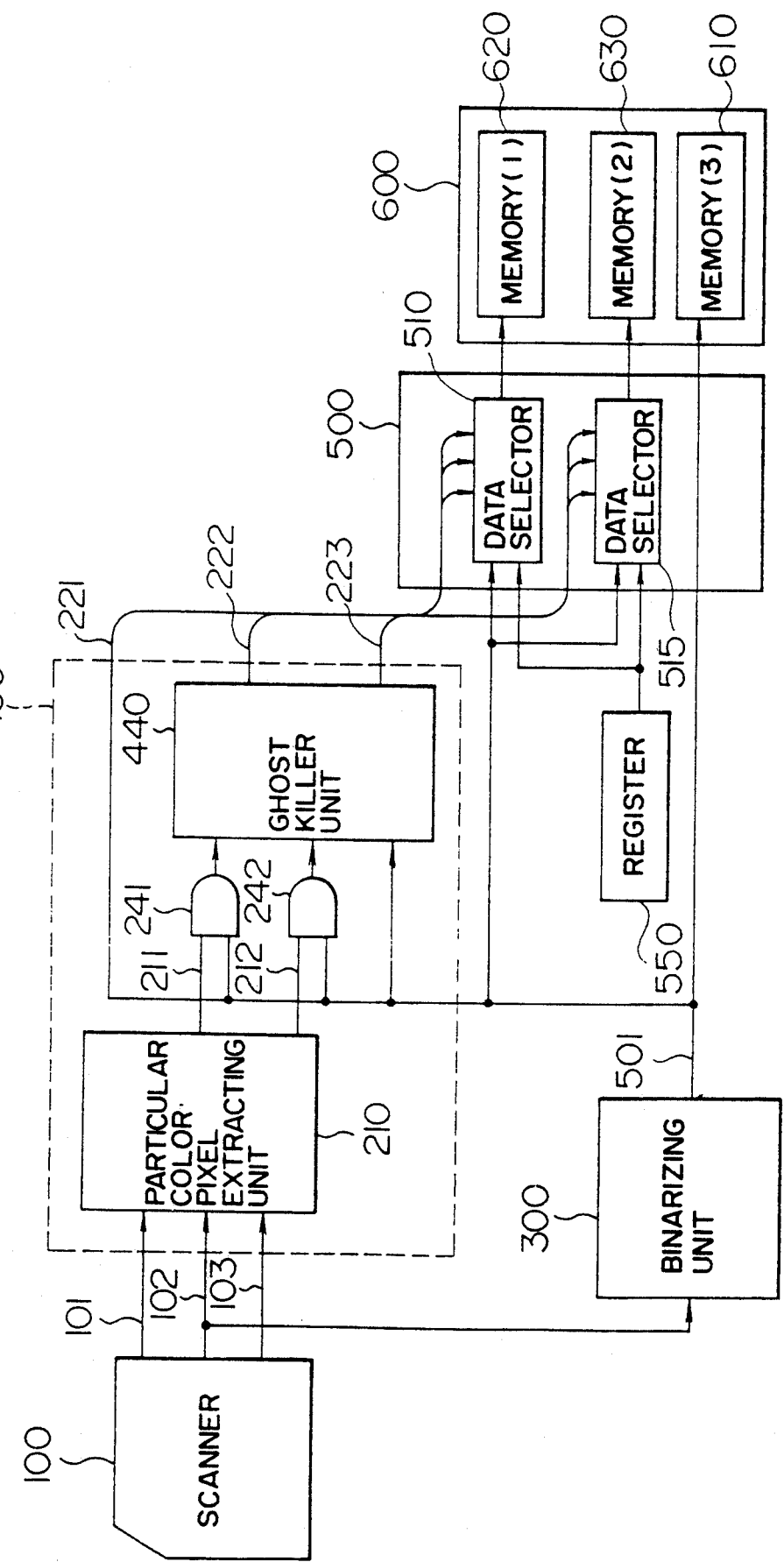

FIG. 26

| | INPUT VALUE | | | OUTPUT RESULT |
|---|---|---|---|---|
| | R | G | B | $FLGR_1$ |
| 1 | 0 | 0 | 0 | 0 |
| 2 | 1 | 0 | 0 | 1 |
| 3 | 2 | 0 | 0 | 1 |
| 4 | 3 | 0 | 0 | 1 |
| 5 | 0 | 1 | 0 | 0 |
| 6 | 1 | 1 | 0 | 0 |
| 7 | 2 | 1 | 0 | 1 |
| 8 | 3 | 1 | 0 | 1 |
| 9 | 0 | 2 | 0 | 0 |
| 10 | 1 | 2 | 0 | 0 |
| 11 | 2 | 2 | 0 | 0 |
| 12 | 3 | 2 | 0 | 1 |
| 13 | 0 | 3 | 0 | 0 |
| 14 | 1 | 3 | 0 | 0 |
| 15 | 2 | 3 | 0 | 0 |
| 16 | 3 | 3 | 0 | 0 |

IMAGE FILING APPARATUS AND METHOD FOR THEREBY ENCODING AND STORING VARIOUS DOCUMENTS

TECHNICAL FIELD

The present invention relates to image filing apparatus which have the functions of receiving and storing a document as image data and, especially, a color document which includes color information such as colored photographs and/or insertions in red and outputting the image data to displays and printers, and image information processing methods. More particularly, the present invention relates to an image processing system such as an electronic filing device which is capable of efficiently encoding an image which includes monochromatic images and color images together and capable of encoding a color image in a form compatible with a device which outputs only monochromatic binary data, for example, a facsimile device.

BACKGROUND ART

Conventionally, in an apparatus which handles a color image as digital data, the image is handled as three kinds of pieces of multivalue data (hereinafter, the respective components are referred to as R, G and B and the respective color data components are written as R-, G- and B-pieces of data) of three primary colors including red, green and blue to which the color of the image is decomposed. For example, in a color copying machine, input R-, G- and B-pieces of multivalue image data are intactly used and outputted. If a binarizing process is required to output the data to a printer, R-, G- and B-pieces of multivalue data are binarized independently for each color and then outputted.

An example in which such highly functionalized processing is used is, for example, disclosed in Japanese Patent Laid-Open JP-A-63-174472 and JP-A-64-51583.

JP-A-63-174472 discloses a color image processing device which calculates luminance information on the basis of three components R, G and B and switches the binarizing process in accordance with the resulting value of the luminance information. JP-A-64-51583 discloses an electronic filing device which decomposes an color image into four colors yellow, magenta, cyan and black, which are then binarized and stored. When image information is decomposed into four colors yellow, magenta, cyan and black, and only information on the black is outputted, colored image portions fail. Display of an intermediate color, for example, of a color photograph is not contemplated. Since a color image is greatly influenced by the characteristic of the output unit with reference to color tone and saturation, the data temporarily stored should be corrected when outputted. In order to correct these data, the image should be handled as multivalue data. Therefore, a system which binarizes and stores a color image such as in the conventional techniques is not applicable to color images the reproduction of the color tone of which is required.

In many cases, color documents contain an image which includes a small-region color image and a layer monochromatic region. Especially, in a monochromatic document with a red stamp or the like, the color information has a meaning only in that it has color, and it is not so important to reproduce the color accurately. Therefore, it is not efficient to store all the R-, G- and B-pieces of data.

Also in a color document which includes a color photograph in addition to characters, the monochromatic character region is larger than the photograph region in many cases.

Therefore, image processing systems which handle documents are required to have a high efficiency of encoding monochromatic images and characters even if the systems are color image processing systems which handle color images.

Encoding R, G and B individually is high in redundancy and low in encoding efficiency. Therefore, it is not suitable for electronic filing systems which store many pieces of document image data and facsimile devices which are required to send document images at low data transfer speed.

Systems which intactly store and output R-, G- and B-pieces of multivalue data handle a large amount of data, so that they are not suitable for the above devices. That portion of an image represented in a monochromatic manner is hereinafter referred to as a monochromatic region.

In TVs, VTRs or the like, techniques are widely used in which R-, G- and B-pieces of color image data are converted to luminance information and two kinds of pieces of chrominance data, the results are then subjected to orthogonal conversion, and the resulting coefficients are encoded and stored. This encoding system only handles luminance information in the monochromatic region which has no chrominance information. Therefore, this system has high encoding efficiency for images which include a larger monochromatic region.

Japanese patent Laid-Open JP-A-63-9282 shows an example in which such encoding system is used also for documents.

However, the data encoding system which uses luminance/chrominance conversion has been devised for devices which originally handle natural images such as, for example, TVs.

Therefore, these system are suitable for handling images in which the density changes slowly, but raise the following problems when they handle document images which contain image portions such as characters which greatly change in density:

(a) Since line figures such as characters change greatly in density, the encoding efficiency greatly decrease;
(b) If the compression efficiency by encoding is increased, irreversible encoding results.

Therefore, if data transfer is made by the medium of raster image data, for example, in a facsimile device, the data changes sequentially each time it is converted and hence transferred;

(c) The data cannot be directly outputted from a device which handles a document as a binary image such as a facsimile device or an electronic filing system; and
(d) Compatibility with conventional monochromatic electronic filing devices is impaired.

As techniques for extracting a particular color, a two-color document reader is known which extracts from the input image a portion having a strong Particular color component determined for each device and outputs it on printing paper with color toner, for example, as disclosed in Japanese Patent Laid-Open JP-A-62-230165. This extracting system optically reads the color component and its corrected color component predetermined by the device and determines whether the portion to be handled has a set color or not, from the difference between the sum of the determined color component and the corrected color component. In this system, the central wavelength of the hue to be extracted is determined by the characteristic of the optical filter, etc.

As image data storage which handle color images, various devices are known which handles a stationary color image. Many of devices of this type use a discrete cosine conversion as an encoding system for image data.

SUMMARY OF THE INVENTION

One object of the present invention is to efficiently encode and store various kinds of document images whether the documents are colored or monochromatic.

Color documents which include colored and monochromatic regions in a mixed manner can be efficiently stored. In particularly multi-color documents such as documents with stamps and having monochromatic regions in which the reproduction of colors is not important, can be encoded more efficiently.

It is another object of the present invention to be able to change the color tone and saturation of a stored color image when same is outputted.

It is a further object of the present invention for a user of the apparatus to externally designate the range of a color to be extracted and to designate a hue while confirming the result of the color extraction.

Facsimile devices and electronic file systems so widely used include an input/output unit which handles a binary monochromatic image. Therefore, if a color document filing system is compatible with such input-/output unit, it will provide wider applications. To this end, compatibility must be maintained in data recording.

The image filing apparatus according to the present invention is compatible with the conventional image filing apparatus which handle a monochromatic image. Therefore, the inventive filing apparatus stores color image data in the form maintained compatible with that of monochromatic image data stored conventionally. In addition, when a large amount of color image data stored in a data storage such as an optical disc is retrieved, the contents of each image are displayed at high speed.

The image filing apparatus according to the present invention includes input means for inputting an image corresponding to a document into the apparatus in the form of multivalue data, input data converting means for converting the multivalue data to binary image data; image memory means for temporarily storing the resulting binary image data; image storing means having encoding and decoding function's of performing a predetermined encoding operation for storing the image data stored in the image memory means and for decoding the stored document image data; output data converting means for outputting desired image data on the basis of the binary image data in the image memory means; and image display means for displaying a desired image on the basis of the image data from the output data converting means.

This kind of image filing apparatus is disclosed in U.S. Ser. No. 07/479615 (EP Application No. 90102974.4) proposed previously by the present inventors.

This application is continuation-in-part application of U.S. Ser. No. 07/479,615 filed Feb. 13, 1990 and the disclosure of the parent application is incorporated herein by reference.

The present invention handles multivalue color image data as a plurality of independent pieces of binary image data as in the parent application.

More specifically, when a color image is to be recorded, three binary images respectively recording R-, G- and B-components of the image are stored as R-, G- and B-pieces of image data, respectively. When the data is to be output, the three binary images are synthesized to express a single color image. For a monochromatic image, only the luminance data of the image is stored as a single image and a monochromatic image is expressed using that luminance data, which may be replaced, for example, with the G-piece of image data.

In the present specification, the three primary color pieces of the data of a color image are hereinafter referred to as R-, G-, and B-pieces of image data. The pieces of data of each of three kinds of binary images used to express a single image are referred to as a plane. Luminance data is expressed as Y.

In order to express particular predetermined colors such as red, blue, etc., in an image, for example, in a document with a red stamp, binary data Y representing luminance information and binary data representing only the particular color are stored separately as an image.

More specifically, a plane of the luminance data recording a binary, or white and black, image is stored. For example, binary image data recording only a particular color pixel to be expressed, for example, in red, is stored in another plane. Namely, the image data is stored as two binary images.

To this end, according to one feature of the present invention, means are provided for extracting the pixel of a part of an input image corresponding to the particular color from the input image.

Important information is that red is "colored" in a multi-color document such as a document with a red stamp or a document corrected in red, and accurate reproduction of a color is generally not sought for. Therefore, these images are handled in a recording type of monochromatic image data and image data designating a colored portion. Namely, the luminance data Y is recorded as a single plane.

According to one feature of the present invention, not only a black pixel but also pixels to be expressed in red or other are described in the luminance plane. When expressed monochromatically, pixels having a particular color such as red characters to be expressed in "red" are extracted from pixels to be expressed in black or pixels where Y = "1", and the extracted particular color pixels are recorded as "1" in a plane, for example R-plane, different from the luminance Plane. The R-plane is recorded as binary image data expressing as "1" only pixels described in "red" and as "0" other pixels. Thus, the pixels of the R-plane are all "0" in the region described in a monochromatic manner, so that the encoding efficiency is high and the R-plane pixels inclusive of color information, are recorded using substantially the same quantity of data as monochromatic binary image data.

When the data is to be output, the pixels of the luminance data Y where the contents of the R-plane are "0" are expressed in black while the pixels of the data Y where the contents of the R-plane are "1" are expressed in red. Since the pixels inclusive of pixels to be expressed in red are recorded in the luminance plane, a multi-color document can be expressed as when it is input in the conventional monochromatic system if only the luminance plane is expressed in a monochromatic manner.

In a document, various kinds of writing means or paper which will be the original color of the document is used. Therefore, even if "red" is simply referred to, the range of its hue is wide. For example, in the standards of vermilion inkpad and ink for stamping, a given allowable range is determined for each of the luminance, saturation and hue for red, blue, etc., and colors used usually fall in those ranges. Therefore, in order to extract any color, it is preferable to designate these characteristics.

Therefore, according to one feature of the present invention, use is made of means for determining whether a relevant pixel is one to be extracted on the basis of the relative relationship between the R-, G-, B-color values, and means for rewriting the result of the determination of the relevant pixel on the basis of a combination of two or more kinds of pieces of binary data and the result of the determination of pixels in the vicinity of each pixel and binary luminance data. In order to arbitrarily designate the range of a hue to be extracted, use is made of means for externally designating a color to be extracted, means for externally designating the range of extraction, means for converting a color having the designated hue and range to three RGB primary color system, and means for rewriting the contents of the means for determining the above mentioned pixel unit on the basis of the result of the conversion.

In order to confirm the result of the determination, use is made, for example, of means for displaying the luminance information on the input image and the relevant extracted pixel in separate expressing means, means for causing the operator to confirm the result displayed in the displaying means before the image is stored and for changing the conditions of extraction as required, and means for inputting the image again to the apparatus and discriminating a particular color of the image depending on the result of changing the conditions. In order to display the extracted pixels in separate expressing means, use is made of means for displaying only the extracted pixel in a particular color and displaying the other pixels in black and white or means for outputting an image indicative of the exclusive-OR of a binary image of luminance information and an image of the extracted pixel, and means for alternately displaying binary the logical-OR image and the binary images of the luminance information.

In order to express a full color image such as a photograph, the respective Pieces of the R-, G- and B-plane data are recorded and the respective planes are displayed by R, G and B.

In order to adapt to the various images, a process for binarizing and storing data in the present invention will be briefly described below.

In the present invention, a binarizing process which binarizes data with a predetermined threshold and a dithering process which binarizes the data using through pseudo-halftone processing are executed concurrently. Desired binarized data is selected from the binarized results for each mode in accordance with a color/monochromate identifier and a character/photograph identifier and stored. In image storage, image data as well as those mode identifiers are recorded. Those mode identifiers are referred to when the image is displayed and are used to designate data required for display and to determine an appropriate synthesizing system.

The contents of the respective modes are as follows:

Mode (I) Monochromatic mode: only luminance data Y of image data is stored. Either the result of simple binarization and the result of the dithering process is selected and recorded in accordance with character/photograph identifier;

Mode (II) Multi-color mode: luminance data Y and data on a pixel expressed in a particular color such as red or blue are extracted and the respective pieces of image data are stored in the corresponding planes. For example, storage is made of two binary images, namely, a binary image (Y-plane) obtained by binarizing the luminance data and a binary image (R-plane) describing only pixels which are required to be expressed, for example, in red among the pixels recorded as black in the binary image. A process for storing luminance data Y is the same as that in mode (I). One of the result of the simple binarization and the result of the dithering process is selected and recorded in the particular color plane in accordance with a character/photograph identifier if the pixel to be handled has the particular color while "0" is recorded in spite of the character/photograph identifier if the pixel has no particular color.

In display, pixels contained in the R-plane are expressed in red and other pixels are expressed in black and white in accordance with the respective values of the pixels in the Y-plane.

Mode (III) Full color mode: R-, G- and B-color pieces of image data are stored in the R-, G- and B-planes, respectively. One of the result of the simple binarization and the result of the dithering process is selected in accordance with the color/monochromate identifier and character/photograph identifier and the pieces of relevant data are stored in the three (R-, G- and B-) planes.

In display, the respective pixel values in the R-, G- and B-planes are synthesized and the result is displayed.

Mode (IV) A mixed mode: A color region which requires color information and a monochromatic region are discriminated from an image. For the monochromatic region, luminance information Y is stored in the G-plane and the R- and B-planes are maintained black. In a document which includes mixed character and photograph regions, the respective pieces of binarized data obtained by R-, G-, and B-dithering processes from the photograph region are stored in the corresponding planes. The respective pieces of binarized data obtained by R-, G- and B-dithering processes from the color region are stored in the corresponding planes. Color/monochrome identifiers Fcm indicative of the colored and monochromatic regions are stored as a fourth plane.

The mode (I) is used to input a monochromatic document into the apparatus.

The mode (II) is a mode in which documents such as monochromatic documents with stamps and/or corrections in a particular color such as red or blue, encountered often in business documents, are handled. This mode is also applicable even if documents with two or more colors to be expressed are handled.

The mode (III) is a mode used when color photographs or the like are handled.

The mode (IV) is a mode in which monochromatic documents and documents with color photographs therein are handled.

The above operation will be described briefly. The inventive image filing apparatus is featured in that all the R-, G- and B-pieces of color information are stored only when color information is required in the image and that only luminance information is stored for monochromatic portions of the image or for a document designated as a monochromatic image originally. For example, in the case of the modes (I) and (II), a pixel displayed in black is recorded as "1" and a blank portion as "0" in the luminance data Y. That is, in the case of the mode (I), the stored image data is only luminance information.

For a multi-color document such as a document with a red stamp which requires no accurate reproduction of a color, a quantity of data of the monochromatic portion may be the same as in the mode (I) processing by using the mode (II) processing. Namely, not only black pixels are recorded but also pixels to be expressed in red or in any other particular color are recorded in the luminance plane Y. Pixels such as red characters having a particular color to be expressed in "red" are extracted from pixels where Y="1" and the extracted pixels having that particular color are recorded in a plane other than the luminance plane. Therefore, the pixels in the plane having the particular color are all "0" in a region described monochromatically, so that the encoding efficiency is high and the pixels inclusive of color information can be recorded with substantially the same quantity of data as in only the monochromatic binary image data.

In the mode (IV) in which a document is handled including full color images such as in color photographs and monochromatic images in a mixed manner, data redundancy in the monochromatic region is suppressed by storing color/monochrome identifying information Fcm. This is especially effective, for example, when a large number of documents is input successively into the apparatus using an automatic reader. If some of the input documents contain color photographs, all the pages of the documents are stored in the three R-, G- and B-planes in the mode (III), so that the stored quantity of data is required to be three times the stored quantity of data of a monochromatic image. On the other hand, in the mode (IV), only luminance data Y in most of the pages is stored, and the R- and B-planes and attribute identifiers are expressed as blank in most of the pages, so that efficient encoding is realized. Assume herein that the attribute identifier outputs "0" if the region concerned is a monochromatic image while it outputs "1" if the region is determined as a color region. In this case, R-, G- and B-binary data are recorded as three planes in the color region while the above-mentioned luminance data (which may be replaced with G-piece of data) and red and blue data are recorded in the monochromatic region. When the image is to be output, a method of displaying data is switched in accordance with attribute information such as a attribute identifier Fcm.

Since image data is binarized and stored in the present invention, the data can be encoded using a MH (Modified Huffman) or MR (Modified Read) system as in the conventional monochromatic binary device. Therefore, a recording medium such as, for example, an optical disc, keeps compatible with a conventional monochromatic system. Therefore, as mentioned above, luminance data Y can be output by a conventional monochromatic system. In these binary image encoding systems, there arise no problems such as rapid reduction in the efficiency of encoding line figure portions such as characters.

In those binary image data encoding systems, a quantity of data including successive 0's and 1's is minimized. Therefore, the efficiency of encoding information where the value of data such as color/monochrome identifying information changes from region to region is greatly high.

A plane for a particular color stored in the mode (II) is blank except for particular color pixels, so that high encoding efficiency is achieved. While in the description the display of red has been described as information on a particular color added to a black and white image, this method is similarly applicable by increasing the number of planes for storage also when two or more particular colors are expressed.

Storage of a full color image will be described below.

If the full color image is expressed with binary information, pseudo-halftone processing is required to reproduce not only density but also color. However, pseudo-halftone processing of line figures such as characters would cause a reduction in the resolution of the image. Therefore, line figures in those portions of documents which requires no reproduction of colors, such as character regions in a full color document, or a partially colored document are stored more precisely by adaptive binarization. On the other hand, the color region is subjected to pseudo-halftone processing in order to reproduce the color even if the color region is made of line figures.

When an image is displayed by overlapping three R-, G- and B-pieces of binary image data, a color which originally does not exist can appear due to the difference between the three data values. This is called color noise, which can occur in the cases of the modes (III) and (IV). In order to prevent the occurrence of such color noise, data equal in quantity to the pixels of the respective three planes is recorded.

In the present invention, in the case of the mode (III), the same value is stored in the respective R-, G- and B-planes for a pixel which is determined as a monochromatic region by the color/monochromatic region determining unit and as a character region in the character/photograph region determining unit. When a color image is to be outputted, the image data is required to be of a multivalue when image processing such as Affine transfer, a change of a particular color or adjustment of the color tone is required. Therefore, multi-data is reproduced from the image stored as the binary data.

BRIEF DESCRIPTION OF THE DRAWINGS

FIGS. 1–1c illustrate one example of image data used when a multi-color document is stored, FIG. 1C shows a R-data plane in which a binary image corresponding to the red color in that document is recorded.

FIG. 2 illustrates a particular color expressed by the respective Y-, R-pieces of binary image data of a multi-color document when the document is stored.

FIG. 3A illustrates a multi-color document including three kinds of black, red and blue characters. FIG. 3B illustrates a luminance data (Y) plane in which a binary image corresponding to black in that document is recorded. FIG. 3C illustrates a R-data plane in which a binary image corresponding to red in that document is recorded. FIG. 3D shows a B-data plane in which a binary image corresponding to blue in that document is recorded.

FIG. 4 illustrates particular colors expressed by the respective pieces Y, R and B of binary image data when the multi-color document of FIG. 3A is stored.

FIG. 5A illustrates one example of a full color document containing a color photograph, etc. FIG. 5B illustrates a R-data plane in which a binary image corresponding to red in that document is recorded. FIG. 5C illustrates a G-data plane in which a binary image corresponding to green in that document is recorded. FIG. 5D illustrates a B-data plane in which a binary image corresponding to blue in that document is recorded.

FIG. 6 illustrates the relationship between input colors and the pieces of binary data recorded in the respective R-, G- and B-planes in the full color mode.

FIG. 7A illustrates a full color document which contains a monochromatic region and a colored region such as a color photograph in a mixed manner. FIG. 7B shows a R-data Plane in which a binary image corresponding to red in that document is recorded. FIG. 7C shows a G-data plane in which a binary image corresponding to green in that document is recorded. FIG. 7D shows a B-data plane in which a binary image corresponding to blue in that document is recorded. FIG. 7E shows an Fcm-plane in which a color/monochrome identifier Fcm is recorded.

FIG. 10 shows the contents of data recorded in each image (frame) memory in each input mode.

FIG. 11 shows one example of a code indicative of each mode designated by an input mode designating unit.

FIG. 12 illustrates one example of the operation of a data selector which selects stored data in accordance with the result of the determination of each input mode and each region.

FIG. 13 illustrates one example of code data used when the input mode designating unit designates an input mode and a region to be handled.

FIG. 14 illustrates the contents of data recorded in each image (frame) memory in each mode when the input document is limited to line figures such as characters.

FIG. 15 illustrates the contents of data recorded in each image (frame) memory in each mode when the input document is limited to photographs.

FIG. 16 shows one illustrative structure of a data storage unit which stores the respective pieces of image data binarized by the input data conversion unit in an embodiment of an image filing apparatus according to the present invention.

FIGS. 17a–7d show a format of image data recorded in the data storage unit. FIG. 17A shows a format of the image data in the mode (I)

FIG. 19 illustrates one example of the operation of the data selector in an output data conversion unit which selects the respective pieces of image data in accordance with mode and display conditions.

FIG. 22 illustrates the contents of binary image data recorded in each plane in the multi-color document when the document is stored FIGS. 23a–23d illustrate another example of image data in a multi-color document when the document is stored. FIG. 23A illustrates one example of a multi-color document containing black characters, red stamps and blue corrections. FIG. 23B shows a luminance data plane in which a binary image corresponding to black in that document is recorded. FIG. 23C shows a R-data plane in which a binary image corresponding to red in that document is recorded. FIG. 23D shows a B-data plane in which a binary image corresponding to blue in that document is recorded.

FIG. 24 shows an embodiment of an image filing apparatus and especially illustrates a particular color identifying unit.

FIG. 25A shows a space of colors expressed in the RGB system. FIG. 25B shows one example of the ranges of red and blue. FIG. 25C shows another example of the ranges of red and blue.

FIG. 26 illustrates the operation of the particular color pixel extracting unit for expression in the RGB system.

BEST MODE FOR CARRYING OUT THE INVENTION

First, referring to FIG. 1, a form of recording image data, which is one of the features of the present invention, when a multi-color document is stored will be described. This corresponds to the above-mentioned mode (II).

Figure 1A:
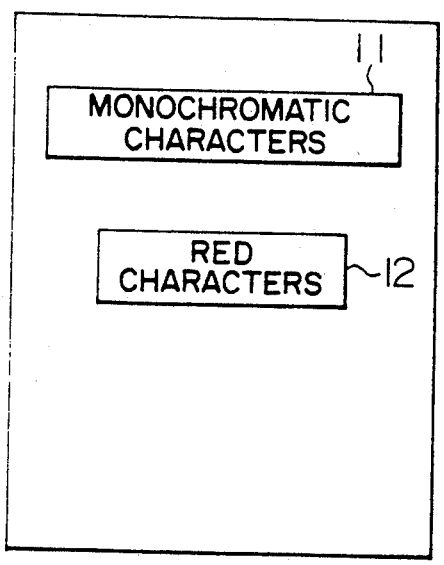
FIG. 1A shows a multi-color document written with characters in particular colors, for example, black and red.
Figure 1B:
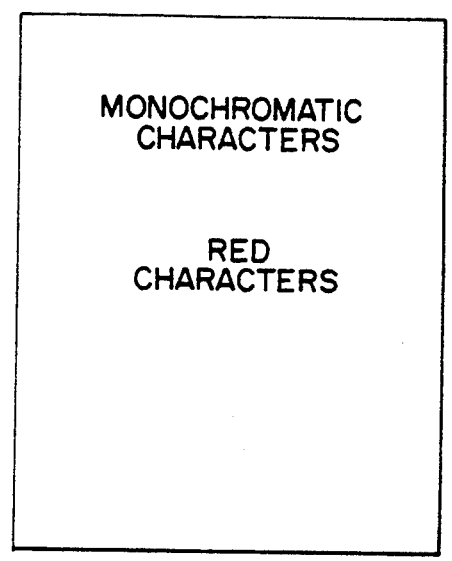
FIG. 1B shows a luminance data (Y) plane in which a binary image corresponding to the black in that document is recorded.
Figure 1C:
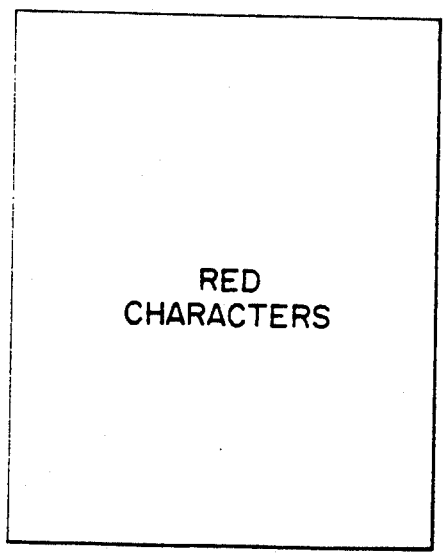
Figure 3A:
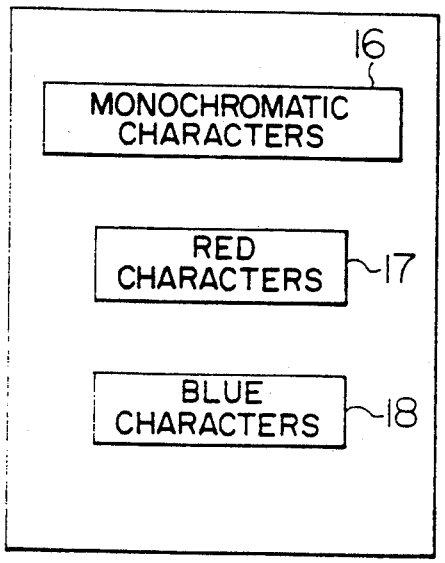
FIGS. 3a–3d illustrate another example of image data used when a multi-color document is stored.
Figure 3B:
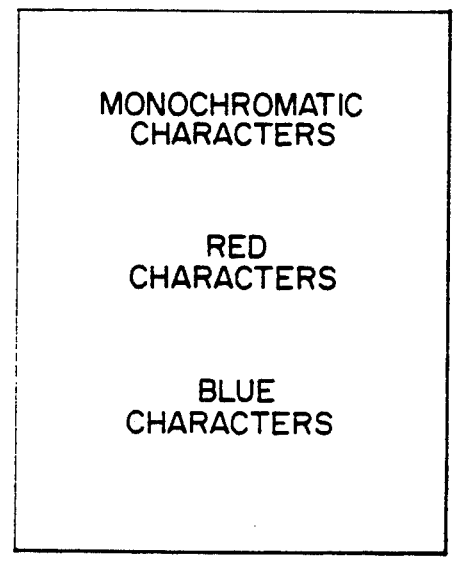
Figure 3C:
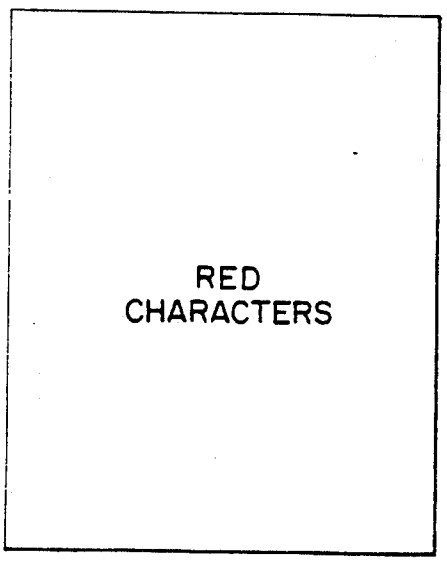
Figure 3D:
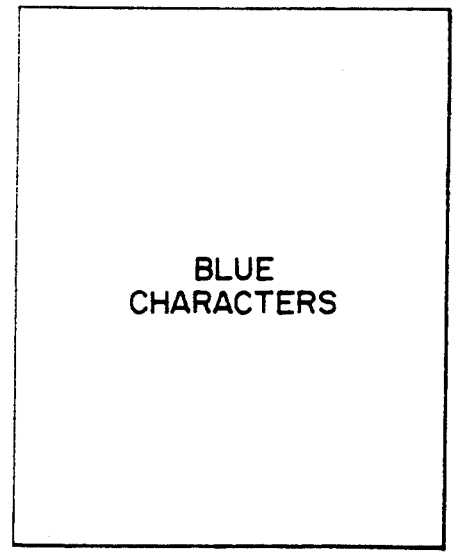

FIG. 1A shows one example of a document with red and black written characters. In FIG. 1A, characters in region 11 are written in black and the characters in region 12 are written in red. When this multi-colored document is inputted in the mode (II), two pieces of binary image data stored in a data storage unit such as, for example, an optical disk are as shown in FIGS. 1B and 1C. FIG. 1B shows a plane in which luminance data Y is recorded. The luminance data plane has recorded binary data thereon. The red and black characters in the original image are written as single-color binary image data. Assume herein that, as mentioned above, pixels where characters are written are "1" and pixels of blank portions are "0". The mode in which only the luminance data Y is recorded in the above-mentioned mode (I).

FIG. 1C shows binary image data described in the R-plane. The "1" is described for only the pixel described as "1" in the luminance data Y and determined as being red. An arrangement for extracting this red and binarizing it will be described later. As a result, the following relationship holds between luminance data Y (x, y) shown in FIG. 1B and R (x, y) shown in FIG. 1C:

if R (x, y) = 1, then Y (x, y) = 1

Therefore, there arises no case in which a pixel in the R-plane is "1" and a pixel in they Y plane is "0".

FIG. 2 shows a combination of binary data Y and R to express each of the colors in a multi-color document in the mode (II). In FIG. 2, Y denotes luminance data and R the contents of the R-data. If the particular colors to be expressed are white, black, and red, the values which the data can assume are three in number as shown.

When a multi-color image is expressed from two pieces of binary image data (shown in FIGS. 1B and 1C) stored in a data storage such as an optical disk, either one of the color output and the monochromatic output is used. FIG. 2 shows the output color. A multicolor image in FIG. 1 is displayed in color, the image data of FIG. 1C is displayed in red and the portion of the image other than red is indicated in black and white in accordance with the image data of FIG. 1B. A specified means for realizing such indicating process will be described in more detail later.

When a plurality of stored images are displayed successively, they can be displayed at high speed by reading only Y data and displaying it in a monochromatic manner. By using only this Y data, data compatibility with a device which handles a monochromatic binary image such as, for example, a facsimile device, is maintained by using such Y data alone. This feature is applicable in other modes.

While only red is handled herein as a color to be reproduced when the image is to be displayed, other colors may be handled similarly. A plurality of colors may be displayed as specified ones. In this case, if, for example, n specified colors are to be expressed, the binary image data in the n+1 planes is stored.

One example in which black and white as well as red and blue are expressed is shown in FIG. 3. FIG. 3A shows one example of a multi-color document on which three colors (black, red and blue) characters are described. In FIG. 3A, the characters in region 16 are written in black; the characters in region 17 are written in red; and the characters in region 18 are written in blue. When this multi-color document is inputted in the above-mentioned mode (II), the image is stored as three pieces of binary image data shown in FIGS. 3B-3D. FIG. 3B denotes a plane in which luminance data Y is recorded. FIG. 3C denotes a red plane and FIG. 3D a blue plane. Each of the planes is binary image data which records pixels having a specified color to be displayed. FIG. 4 shows a combination of Y-, R- and B-pieces of binary data to express the respective colors in the document in conjunction with the corresponding output colors.

Figure 5A:
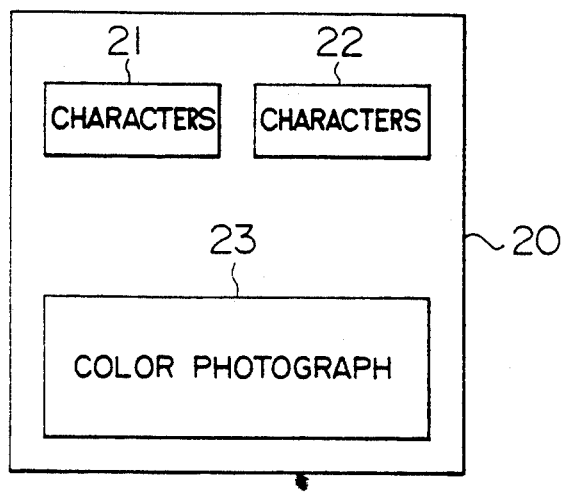
FIGS. 5a–5d illustrate one example of image data in a full color document when stored.
Figure 5B:
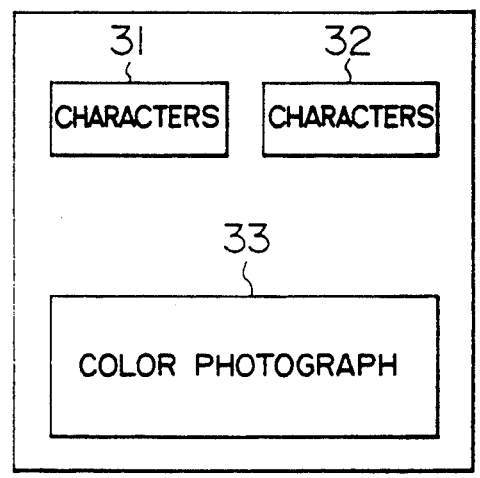
Figure 5C:
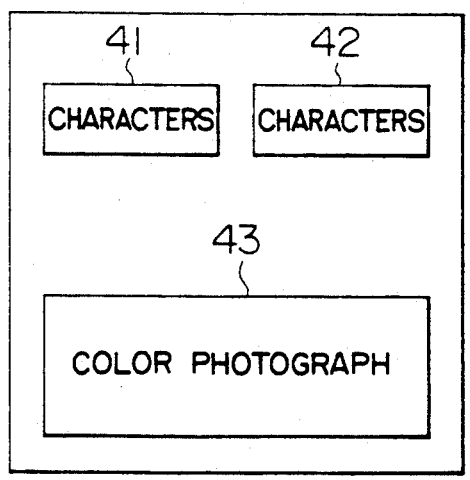
Figure 5D:
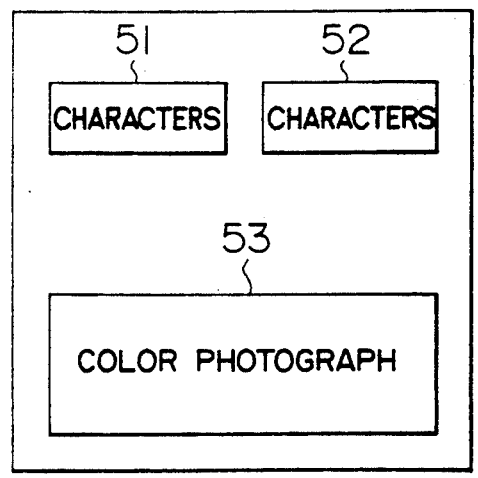
Figure 7A:
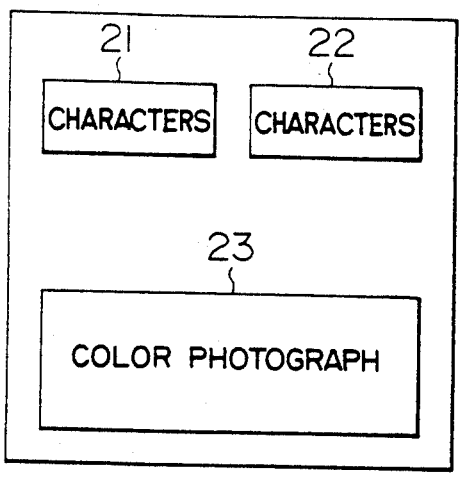
FIGS. 7a–7e illustrates another example of image data of a full color document when stored.
Figure 7B:
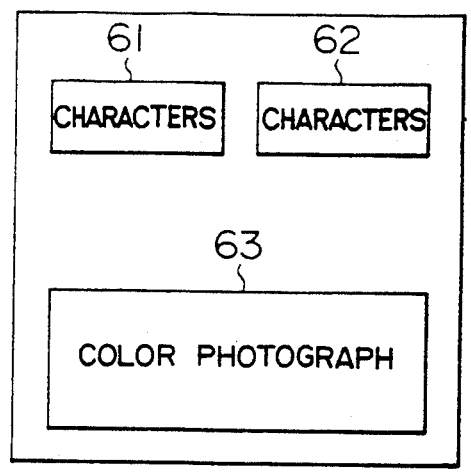
Figure 7C:
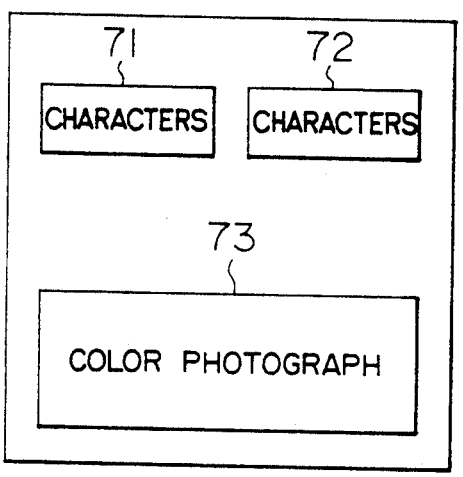
Figure 7D:
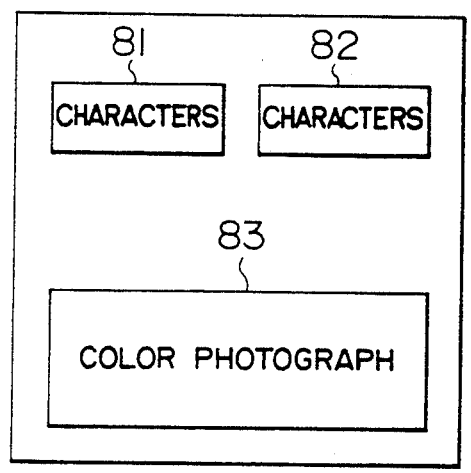
Figure 7E:
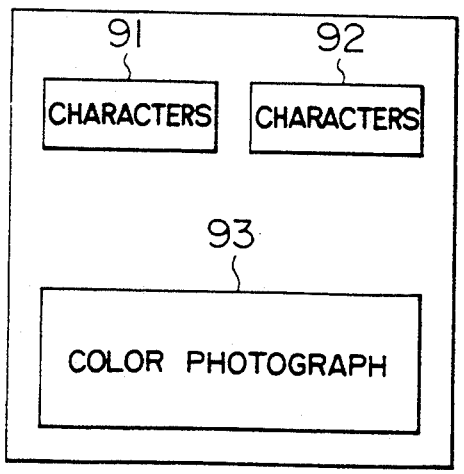

The mode (III) in which a full color document such as a color photograph is handled will be described. FIG. 5 shows the form a recording image data in the mode (III). Image is recorded as three (R, G and B) pieces of binary image data. Reference numeral 20 in FIG. 5A shows one example of a document which contains a color photograph and characters. FIGS. 5B, 5C and 5D show the respective pieces of binary image data in the R-, G- and B-planes. In FIG. 5A, the characters in region 21 are described in black; and the characters in region 22 in a specified halftone color. Region 23 denotes a region in which a color photograph is recorded.

FIG. 6 shows colors expressed in accordance with the contents of the image data in the respective planes. In the case of mode (III), black and white each are handled as a single color.

If a full color image such as a color photograph shown as region 23 in FIG. 5A is expressed in the respective R-, G- and B-components of binary data, the respective R-, G- and B-pieces of multivalue data are binarized by the corresponding pseudo-halftone processing. Therefore, the pieces of data derived from binarizing the respective R-, G- and B-pieces of multivalue data independently in the pseudo-halftone processing are recorded in regions 33, 43 and 53, respectively.

In this mode, a black and white character region such as, for example, region 21, is not subjected to pseudo-halftone processing in the binarization. It is carried out by separating the character regions and photograph region from the image in the input document and selecting the results of simple binarization and pseudo-halftone processing using the result of the separation. In order to correctly express a region where black characters are described, the values of pixels among the R-, G- and B-planes are made equal. More specifically, the pixels of the character region which have been determined as the monochromatic region are expressed by recording the same value in the R-, G- and B-planes. Therefore, regions 31, 41 and 51 have the same values recorded.

However, if a color is to be reproduced using colored characters in a character region, for example, in region 22, pseudo-halftone processing is required to express colors. Therefore, the character region is distinguished from the photograph region, and the color region is distinguished from the monochromatic region. The respective pixels in the colored character regions 32, 42 and 52 have the corresponding independent values recorded.

Selection of the results of various determinations and binarization in the designated mode will be described in detail later.

The mode (IV) in which a document containing a color region and a monochromatic region together is handled will be described.

This mode is effective for storing as image data a document such as a reference of many pages. Generally, if a reference or the like of many pages is input, a device, for example, called a sorter, which automatically inputs references, is used. In this case, the inputting efficiency is improved because no attendant is required. However, if there is no operator available during inputting the document, it is difficult to switch a mode for each page. If a color region is contained in some page of the input reference, it is necessary to input the images in all the pages as color images. If the images in all the pages are stored in the mode (III), image data in the monochromatic region requires three times as much as data input in the original monochromatic mode (I). In contrast, in the mode (IV), there is a fourth plane of identifiers indicative of whether the respective portions of the image are color regions or monochromatic regions. Each identifier is realized by a binary flag, so that it can be recorded as in the respective planes described above.

FIG. 7 shows one example of the form of recording image data in the mode (IV). FIG. 7A shows an example of image of exactly the same color document as in FIGS. 5A. FIGS. 7B, 7C and 7D shows R-, G- and B-pieces of binary image data. Fcm denotes a binary identifier to identify a color region from a monochromatic region in each of the image portions. Assume now that the identifier Fcm (x, y) is "1" if the approximate pixel IM (x, y) is colored, and is "0" if it is monochromatic. Binary data Fcm is "1"in region 92, 93 corresponding to the color regions 22, 23 in the image of FIG. 7A and "0"in other portions R-, G- and B-pieces of binary image data are written in those portions of R-, G and B-planes where Fcm=1. In these regions black is written as being R=G=B=0. For example, in the region 21 of black characters, the recording form is the same as the monochromatic case. A pixel to be written as black is written as "1" only in one of the R-, G- and B-planes. Assume herein that the G-plane is the appropriate one.

In the image display, image data is read from only the G-plane for the image portions where Fcm=0 in the mod (IV). If G=1, black is output and if G=0, white is output. For the pixels where Fcm=1, the three (R-, G- and B-) planes are read and displayed as in the mode (III). Therefore, in the mode (IV), the image output unit switches the color of display in the G-plane in accordance with the value of identifier Fcm.

If image data is recorded in the mode (IV). Fcm=0, R=— and G=0 at all times for a monochromatic character image and high encoding efficiency is achieved. So that a document is stored which contains a color image and characters together, using substantially the same quantity of data as in the monochromatic mode input.

Also, in the color region, identifier Fcm is switched between 0 and 1 in units of a region, so that the encoding efficiency is high and image data is stored with substantially the same quantity of data as in the mode (III).

One embodiment of an image filing apparatus which stores image data in each of the above modes will be described. First, the entire structure of the embodiment of the image filing apparatus is shown in FIG. 8.

Figure 8:
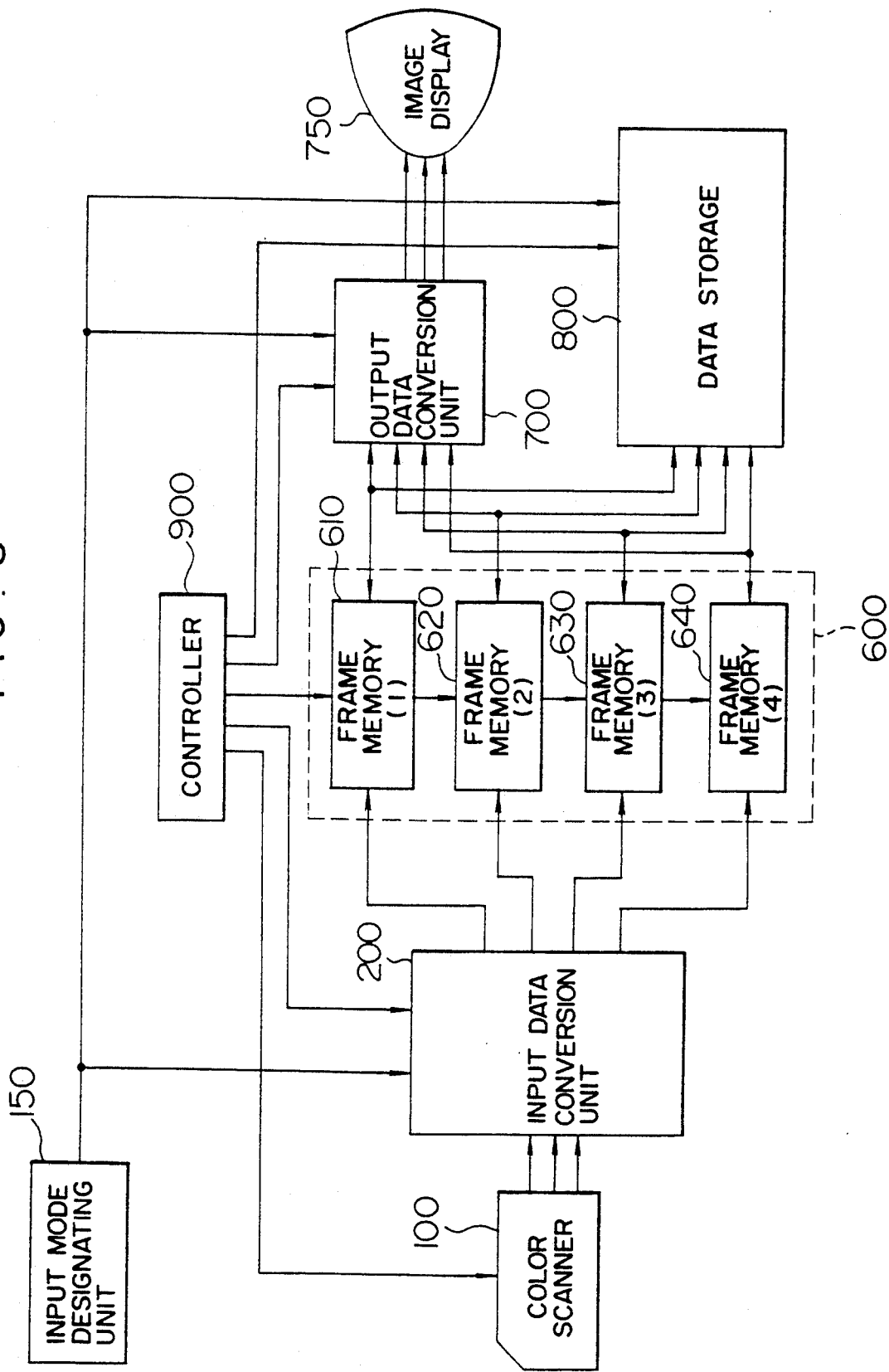
FIG. 8 is a block diagram illustrating one example of an image filing apparatus according to the present invention.

In FIG. 8, reference numeral 100 denotes a color scanner which optically reads an image, for example, in a document and outputs multivalue digital data, for example, of three components R, G and B: 150, an input mode designating unit which designates one of the modes (I)-(IV); and 200, an input data conversion unit which binarizes the multivalue data of each of the input R-, G- and B-colors for data storage. Reference numeral 600 denotes an image memory for temporarily storing a binary image data which is the output of input data conversion unit 200 and includes, for example, four frame memories 610, 620, 630 and 640. Reference numeral 700 denotes an output data conversion unit which converts binary image data to a form suitable for input to a display such as, for example, a high resolution color CRT; and 750, an image display such as a high resolution CRT which receives multivalue data and displays a color image. Reference numeral 800 denotes a data storage such as an optical disk which includes a large capacity of memory which encodes and stores binary data in image memory 600, and which reads and decodes the data already stored; and 900, a controller for control of the entire filing apparatus.

One of the features of the present image filing apparatus is an input data conversion unit 200. Those components shown in FIG. 8 related to inputting an image will be described with reference to FIG. 9 in which reference numerals 610, 620, 630 and 640 each denote a frame memory which temporarily stores binary data in each of the planes. The input data conversion unit 200 includes a region determining unit 400, a binarizing unit 300 and a selector 500. It performs a binarizing operation and selects image data to be stored in each of the frame memories in accordance with a mode designating signal and/or various results of region determination.

Region determining unit 400, which determines a region for an input image, includes a color/monochrome identifying unit 410 which determines which of the colored and monochromatic regions each of the pixels of the input image belongs to, using three: (R-, G- and B-) pieces of multivalue image data obtained from color scanner 100; a color identifying unit 420 which determines whether each pixel of the input image belongs to a predetermined specific color such as, for example, red or blue; and a color/photograph region determining unit 430 which receives multivalue digital image data and determines which of a line figure region for a character and a halftone region for a photograph, each of the pixels of the received image belongs to.

The binarizing unit 300 which binarizes the R-, G- and B-pieces of the multivalue image data separately includes a binarizing unit 340 which binarizes an image such as a character or a line figure; and a dithering processor 350 which performs a binarizing operation using pseudo-halftone processing. Binarizing unit 340 binarizes multivalue image data with a predetermined threshold, and is suitable for binarizing an image such as a character or a line figure. Dithering processing unit 350 periodically changes the threshold in accordance with the position of pixel and binarizes the data and is suitable for binarization of a photograph or a color image. The pseudo-halftone processing includes an error diffusion method or average error minimum method, which may be used, in addition to the dithering process. The halftone processing using the error diffusion method is suitable for binarizing an image having periodicity such as a halftone image.

Selector 500 selects data, to be stored in image memory 600, from two kinds of results of binarizing three (R-, G- and B-) images in accordance with mode designating signal Fmod from input mode designating unit 150 and the respective results of determination from region determining unit 400, and outputs the selected data.

FIG. 10 shows the contents of binary image data to be recorded in each of frame memories 610, 620, 630 and 640 of image memory 600 in each mode. The pieces of data developed in frame memory 610, 620, 630 and 640 are hereinafter referred to as DATA-1, DATA-2, DATA-3 and DATA-4, respectively. In FIG. 10, the sign "-" implies that no data is recorded. Binary image data stored in the mode (I) is only luminance data Y and recorded in frame memory 610. In mode (II), the binary image data of the two planes is stored and, in the mode (III), the binary image data of the three planes is stored. In addition, in the mode (IV), the binary image data of the four planes is stored in frame memories 610, 620, 630 and 640.

In order to briefly illustrate the features of the present embodiment, assume that color scanner 100 simultaneously outputs the R-, G- and B-pieces of multivalue data on the respective pixels of the input image. Signal lines 110, 120 and 130 send R-, G- and B-pieces of data, respectively, therethrough. For simplicity of explanation in the present embodiment, G-data is substituted for luminance data Y, while luminance data Y may be calculated by calculation of three kinds of R-, G- and B-pieces of multivalue data.

Color/monochrome identifying unit 410 outputs a binary color/monochrome identifyer Fcm used in the modes (III) and (IV) using known means from input R-, G- and B-pieces of multivalue data.

Color identifying unit 420 is intended to extract pixels to be recorded in a particular color plane in the mode (II). In the present embodiment, extraction of a red pixel will be described as an example. The number of extracted particular colors is one or more and color itself may be set optionally. An identifier Frb output from color identifying unit 420 varies in form depending on the number of extracted colors and becomes a 1-bit signal when only red is extracted. The following relationship holds between the number of extracted specified colors Cnb and the number of bits N of identifier Frb:

$$N \geq \log_2 (Cnb+1)$$

Well-known various methods may be used which use an offset between R-, G- and B-values in order to extract the particular color.

Character/photograph region determining unit 430 is intended to select from binarizing unit 300 binarized data obtained by simple binarization suitable for characters and line figures and binarized data obtained from pseudo-halftone processing suitable for a photograph and a color image. A specified means is, for example, described in Japanese Patent Laid-Open JP-A-63-316566. The result of determination Fdm is a binary data. If the result of determination Fdm varies depending on color, the output of selector 500 becomes unstable, so that determination of character/photograph region is made for luminance data. In the present embodiment, G-data is substituted for the luminance data, as mentioned above.

FIG. 11 shows one example of a mode designating code Fmod inputted by input mode designating unit 150. By an identifying code which selects four kinds of input modes, selector 500 is driven. Selector 500 selects one or more pieces DATA-1 to DATA-4 of binary data output to one or more of four frame memories 610, 620, 630 and 640 of image memory 600 from binary image data of R-, G- and B-planes or data in a total of six planes output from each of binarizing unit 340 and dithering unit 350.

Figure 9:
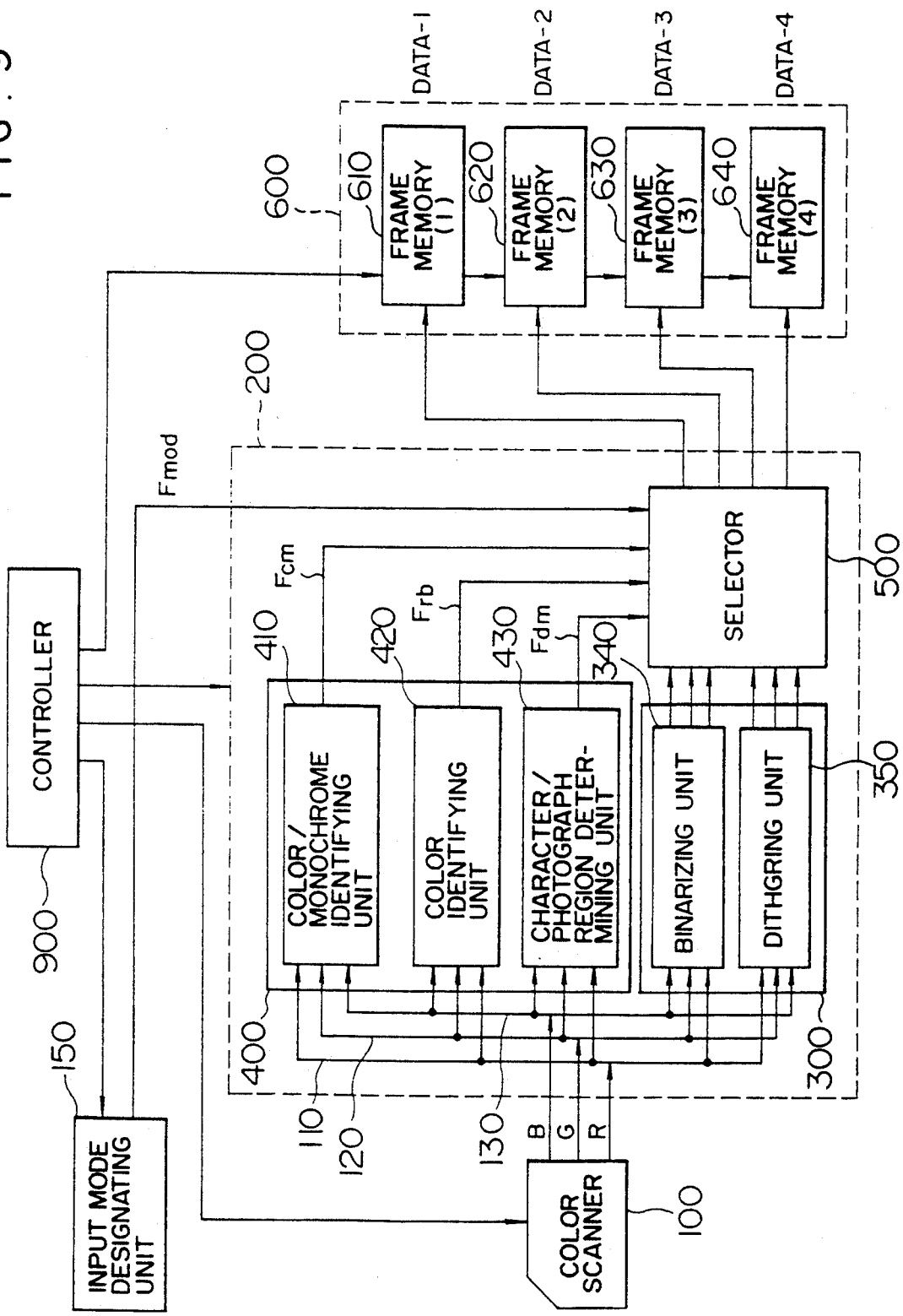
FIG. 9 shows one example of an image filing apparatus according to the present invention and one illustrative structure of an input data conversion unit which converts an input document to binary image data.
Figure 17A:
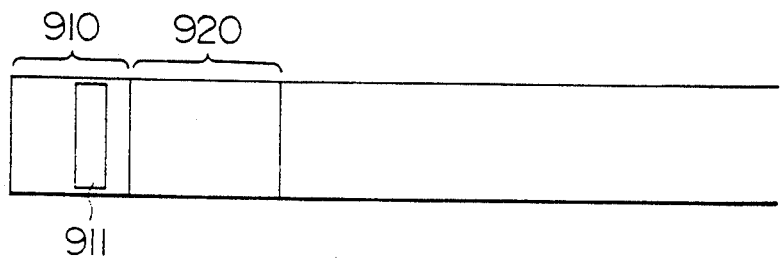
Figure 17B:
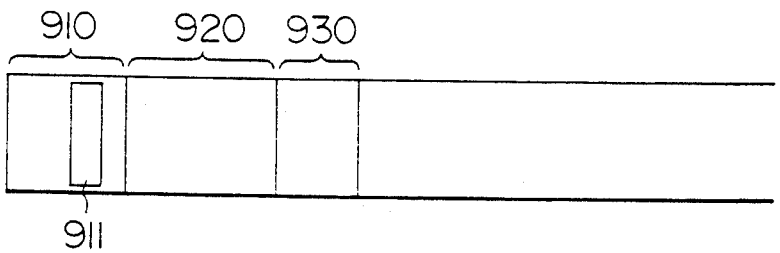
FIG. 17B a format of the image data in the mode (II)
Figure 17C:
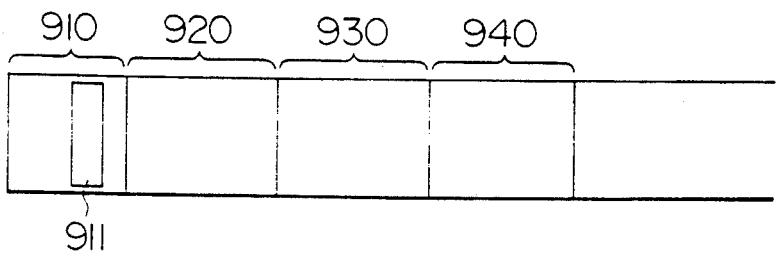
FIG. 17C a format of the image data in the mode (III)
Figure 17D:
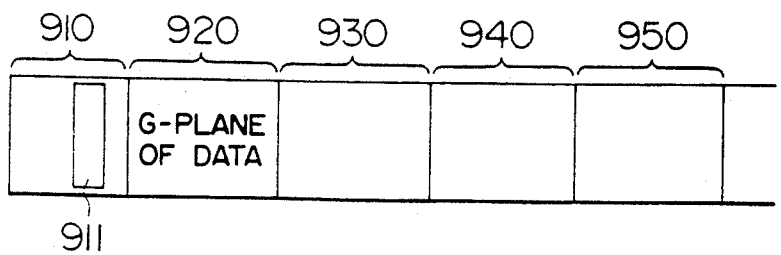
FIG. 17D a format of the image data in the mode (IV).

A illustrative operation of selector 500 in the particular embodiment will be shown in FIG. 12 in which pieces of data shown by Rc, Gc and Bc output from selector 500 are the result of binarizing R, G and B by binarizing unit 340 of FIG. 9, and pieces of data Rd, Gd and Bd from selector 500 are the result of binarizing R, G and B by dithering unit 350.

In the mode (I), only the luminance data is output and only one of Gc and Gd is output to frame memory 610. Selection between Gc and Gd is made in accordance with the output Fdm of character/photograph region determining unit 430. If an image to be input includes only one of characters and a photograph, either one of them may be designated externally using input mode designating unit 150, which will be described in more detail later.

In the mode (II), binary image data for two planes is stored in frame memories 610, 620 in the present embodiment. Selection of the stored data is controlled by outputs Fdm and Frb of character/photograph region determining unit 430 and color identifying unit 420. One of the result of the simple binarization Gc and the result of the dithering process Gd is selected and recorded in accordance with identifier Fdm in DATA-1 as in the mode (I). Not only black pixels but also pixels to be expressed in any particular color are recorded in the DATA-1 luminance plane. The present embodiment shows the use of 1-bit code data as identifier Frb, which is "1" if a pixel to be handled has a particular color "red", and "0" otherwise.

If identifier Frb is "1", DATA-2 selects one of the result of the simple binarization Gc and the result of the dithering process Gd in accordance with identifier Fdm and becomes "0" if identifier Frb is "0" in spite of identifier Fdm. In the mode (II), selection between Gc and Gd is made by identifier Fdm as in the mode (I).

In the mode (III), the image is stored as binary image in the R-, G- and B-planes. The data to be stored is for each of the R-, G- and B-planes. If color/monochrome identifier Fcm is "0", one of the result of simple binarization Gc or the results of the dithering process Gd, Rd, Bd is selected in accordance with identifier Fdm and the data for the three planes are stored in the DATA-1 to DATA-3, respectively. If identifier Fcm is "1", the results of the dithering process Gd, Rd and Bd are selected and the data for the three planes are stored in the corresponding DATA-1 to DATA-3, respectively, regardless to the identifier Fdm.

In the mode (IV), the respective R-, G- and B-pieces of the image data and identifier Fcm are stored in frame memories 610, 620, 630 and 640, respectively. While either the G-plane or the luminance plane is stored in frame memory 610 in accordance with the output Fcm of color/monochrome identifying unit 410, no selection is usually required, as mentioned above, in the present embodiment because the G-data and the luminance data are the same. However, in a document which contains a character region and a photograph region, the output of binarizing unit 340 is selected from the monochromatic line figure region and the output of the dithering unit 350 is selected for the other regions. Therefore, in the mode (IV), either the result of simple binarization Gc or the result of dithering process Gd is selected in accordance with identifier Fdm if the output Fcm of color/monochrome identifier 410 is "0" and such data for one plane is stored in DATA-1. One of "0" and the results of dithering process Rd, Bd is selected in accordance with identifier Fdm and stored in the respective DATA-2 and DATA-3. If identifier Fcm is "1", the results of dithering process Gd, Rd, Bd are selected and such data for three planes are stored in the corresponding DATA-1 to DATA-3, if identifier Fcm is "1". Identifier Fcm is stored in DATA-4.

In the above example, it has been assumed that a document to be handled contained characters and photograph" together. However, when a document consisting of only characters or photographs is to be input, input mode designating unit 150 may, for example, designate the respective kinds of regions such as [characters], [photographs], or [mixture] in addition to one of the modes (I)–(IV) to determine the operating conditions of selector 500 irrespective of character/photograph region determining unit 430. In this case, the signal from input mode designating unit 150 to selector 500 involves an input mode, for kinds of selective codes and a 2-bit identifying code for the document to be handled.

FIG. 13 shows one example of an output code from input designating unit 150 in this case. Basically, there are [characters] where no dithering process is selected, [photographs] in which the dithering process is necessarily selected, and [mixture] based on the output of the determination of characters/photograph region determination in each of the four kinds of modes. For [characters], the output of binarizing unit 340 is normally stored. In the modes (III) and (IV), reproduction of a halftone color is required, so that no output from binarizing unit 340 is stored. Therefore, in the modes (III) and (IV), designation of [characters] is excluded.

An illustrative operation of selector 500 performed when [characters]is designated and an illustrative operation of the selector when [photographs]is designated are shown in FIGS. 14 and 15, respectively. These operations are identical to the respective operations of selector 500 of FIG. 12 for the character and photograph regions, respectively, and a further description thereof will be omitted.

Storage of binary image data selected by selector 500 will be described next. Binary data DATA-1, -2, -3 and -4 stored in frame memories 610, 620, 630 and 640, respectively, in image memory 600 are encoded by known means and stored in a large capacity of data storage such as an optical disk. One illustrative structure of data storage 800 will be described with reference to FIG. 16, in which 610, 620, 630, 640 denotes frame memories which store binary image data for the respective planes, as mentioned above. Reference numeral 800 corresponds to the data storage shown in FIG. 8. In the figure, a reference numeral 810 denotes a selector which sequentially reads data stored in each frame memory, and outputs it to encoding/decoding unit 820 and the data recorded by encoding/decoding unit 820 to the respective frame memories. Encoding/decoding unit 820 encodes binary data using known means, outputs it to data storage 850 such as an optical disk, decodes data stored in data storage 850 and outputs it to selector 810.

Given a command to store data from controller 900, the filing apparatus first transfers header information to optical disk 850 for storage. The header information includes information, for example, on the title of a document used for retrieval, the size of the document, etc. In the present embodiment, the input mode is recorded in a code as one item of the header information. After storage of the header information, encoding/decoding unit 820 sequentially encodes binary image data in the 1–4 planes in accordance with mode and stores it in data storage 850. The sequence of data to be stored is selected by selector 810 in accordance with a command from controller 900.

The sequence of recording data to be stored in data storage 850 will be described with reference to FIG. 17. FIGS. 17A–17D each show one example of a recording format of image data inputted in modes (I)–(IV). In the figures, reference numeral 910 denotes a region where the header information is recorded. Reference numeral 920, 930, 940 and 950 denote regions where DATA-1, -2, -3 and -4, respectively, are recorded.

In the mode (I), the image data to be stored is only the luminance plane and DATA-1 in frame memory 610 is stored. In the modes (II)–(III), the luminance plane is stored as image data next to be header information, and the respective color planes are recorded after the luminance plane. If a plurality of particular colors are to be expressed in mode (II), the respective planes are recorded sequentially after the luminance plane. As a result, if an image is retrieved and displayed, the first data directly after the header information is only required to be read to output the monochromatic binary image. In mode (IV), G-data is recorded directly after the head information because a phenomenon in which a particular color is not reproduced is most difficult to occur since the spectrum of G-data is positioned intermediate among the R-, G- and B-data. Therefore, if this case is also to be expressed, the first data directly after the header information is only required to be read to output a monochromatic binary image. Code information indicative of a mode in which each image is inputted is recorded in recording region 911 for header information 910.

A process in which the image data stored in data storage 800 is read and in which the image is displayed will be described next.

First, the process in which the image data stored in data storage 850 is read and input to frame memories 610, 620, 630, 640 in image memory 600 will be described with reference to FIG. 16. First, the header information of each data stored in storage 850 is read and the data to be handled is retrieved. If this data is confirmed, the number of planes to be read is determined using mode identifier Fmod stored in recording region 911 in the header information, a required number of pieces of data stored in data storage 850 is read and decoded to the binary pieces of data by encoding/decoding unit 820 and the resulting pieces of data are stored as DATA-1 to DATA-4 in frame memories 610, 620, 630 and 640.

Next, DATA-1 to DATA-4, developed in frame memories 610, 620, 630 and 640, are converted by output data conversion unit 700 to data having the form suitable for an input to image display 750, such as a high resolution color CRT, and the resulting data is then displayed on image display 750. The operation of output data conversion unit 700 is first to produce image data for display of the R-, G- and B-planes from the input binary data of one or more of the planes. The displayed R-, G- and B-pieces of data reproduced from the image data are hereinafter referred to as DATA-R, DATA-G and DATA-B, respectively, herein. The relationship between DATA-R, DATA-G and DATA-B and the colors displayed on image display 750 is similar to that in FIG. 6. When all the DATA-R, DATA-G and DATA-B are "1", "white" is displayed, while when they are all "0", "black" is displayed.

Figure 18:
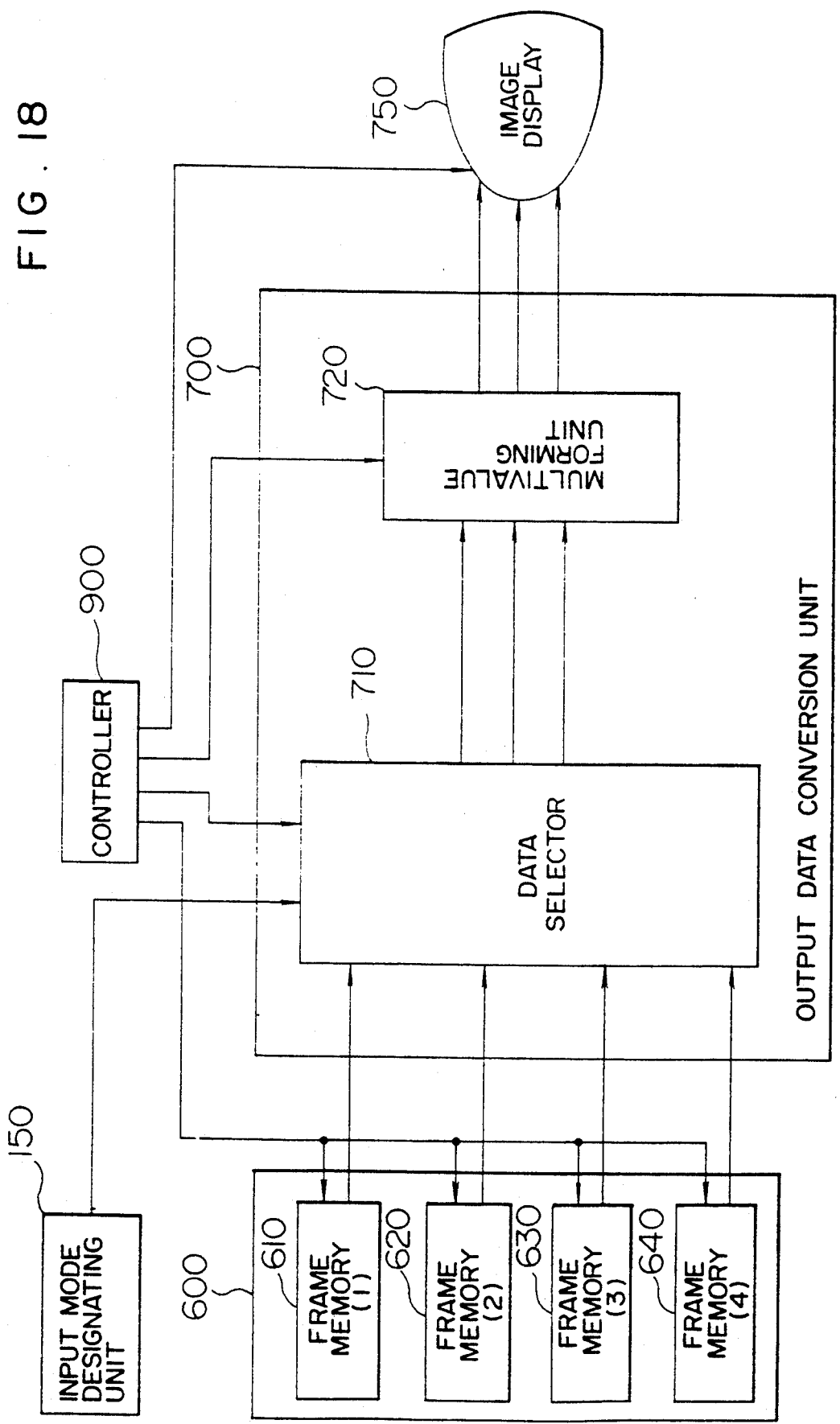
FIG. 18 shows an embodiment of an image filing apparatus according to the present invention and one illustrative structure of an output data conversion unit to display image data.

With respect to FIG. 18, one illustrative structure of the output data conversion unit will be described. In the figure, data selector 710 is controlled by controller 900 in accordance with the mode identifier Fmod in the read header information to thereby synthesize required data of DATA-1, DATA-2, DATA-3 and DATA-4 and to output DATA-R, DATA-G and DATA-B. The contents of this operation will be described in more detail later. The R-, G- and B-pieces of binary data of the three planes are converted by multivalue forming unit 720 to data having a form suitable for image display 750. The processing in the element 720 includes conversion of the binary data to a signal to control the turning-on/off of each of the pixels in the image display, for example, using a bit shift operation. The operation of the output data conversion unit 700 varies depending on the mode of an image to be handled, the kind of display and the contents of the data.

FIG. 19 shows one illustrative operation of data selector 710. When an image, for example, in the mode (II) is displayed in color, DATA-R, DATA-G and DATA-B are determined by a logical operation of DATA-1 and DATA-2. If only luminance information DATA-1 is "1", all of DATA-R, - G and -B are "0", indicating "black". If DATA-1 and DATA-2 are "1", only DATA-R is caused to become "1", indicating "red".

The timing at which the image is displayed is as follows: If, for example, a monochromatic image is displayed, a luminance data Y is input to frame memory 610 and, simultaneously, the respective pieces of luminance data are output as the data of the R-, G- and B-planes from data selector 710. The respective pieces of image data having the values equal to the R-, G- and B-planes are sent from multivalue forming unit 420 to image display 750, so that a monochromatic image is displayed on image display 750.

If a full color image in the mode (III) is to be displayed, the values of DATA-R, DATA-G and DATA-B are determined by DATA-1, DATA-2 and DATA-3, separately. The timing of image display is such that DATA-1, DATA-2 and DATA-3 are written into the frame memories and, simultaneously, the G-, R- and B-planes are sequentially displayed.

The image data of mode (III) is to be displayed, the final color can not be determined until the three plane data are stored in frame memories 310-330. In this case, it is effective that luminance data is first displayed in a monochromatic image as in mode (I) and sequentially rewritten.

By controlling the operation of data selector 710 in accordance with a command from controller 900, for example, a color image can be displayed in a monochromatic manner. More specifically, monochromatic display is achieved by reading only DATA-1 and displaying same together with R, G and B.

Only the red plane can be selected and displayed by displaying only DATA-2 of the image data of the two planes of the multi-color document inputted, for example, in the mode (II).

The light and shade of a full color image which is handled in mode (III) or (IV) is naturally required to be expressed in halftone. Especially, for color photographs, a fine difference in color tone due to the characteristics of the output units is seen as a great difference by human eye. Therefore, in order to express a full color image in high image quality, it is necessary to correct and change the luminance and chromaticity of the halftone data. In the present embodiment, an image is stored as binary data, so that, to this end, it is necessary to convert binary image data to multivalue data.

Figure 20:
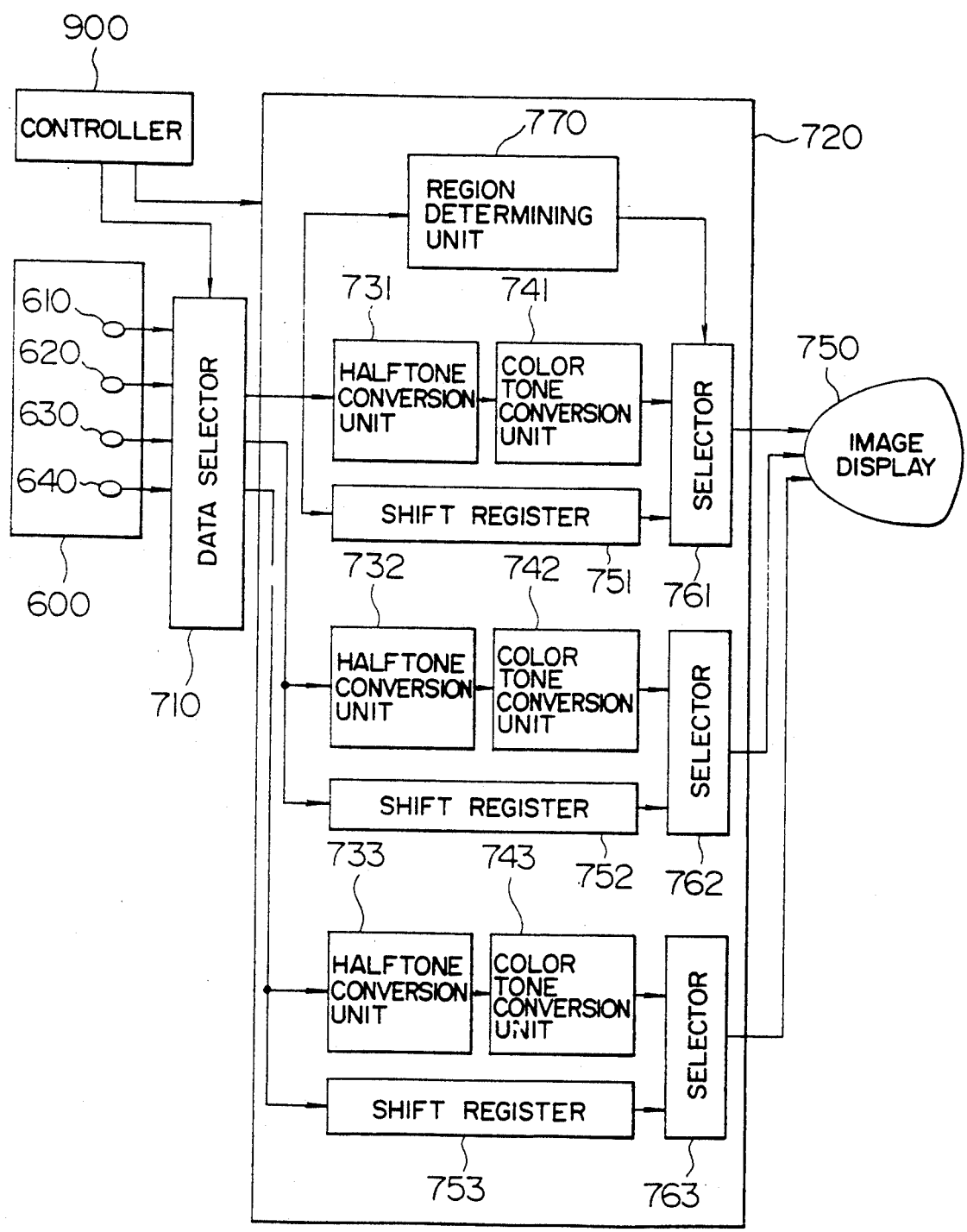
FIG. 20 shows one embodiment of an image filing apparatus according to the present invention and illustrates one structure of a multivalue forming unit in the output data conversion unit.

FIG. 20 shows an illustrative structure of multivalue forming unit 720. This embodiment shows that unit 720 simultaneously receives three kinds of binary data, DATA-R, DATA-G and DATA-B, and outputs them to image display 750. By using a memory for temporarily storing data, the data may be converted plane by plane. In Fig. 20, reference numerals 731, 732, 733 each denotes halftone conversion unit which reproduces multivalue data from image data; 741, 742, 743 each denotes a color tone conversion unit which converts halftone data; 751, 752, 753 each denotes a shift register which multiplies binary data by a constant factor; 770 denotes a region determining unit which determines whether the received data is binary data, for example, of line figures or pseudo-halftone data; and 761, 762, 763 each denotes a selector which selects one of two kinds of pieces of halftone data from the output of region determining unit 770.

For simplicity, the operation of multivalue forming unit 720 for one plane will be described herein but this explanation is applicable to the operations for other planes. Halftone conversion unit 731 reproduces multivalue halftone data from a pseudo-halftone image. Various reproducing methods are already known. A system for extracting the distribution density of black pixels in a near local region, for example, disclosed in U.S. Ser. No. 07/272,442 (Japanese Patent Laid-Open JP-A-2-90377) is applicable. The image converted to halftone is subjected to required conversions by the color tone conversion unit for the corresponding R-, G- and B-planes. The color tone conversion unit 741 may be represented, for example, by a ROM (Read Only Memory). The contents of the ROM may be set beforehand, transferred, for example, by controller 900 and so, it can be achieved by a system selected in accordance with a plurality of kinds of internal devices previously set.

In a region of line figures such as characters, the positional relationship of black pixels is important. Expression of light and shade can deteriorate resolution and hence image quality. If display 750, connected to a system, has an input range, for example, of 8 bits, a deterioration in the image quality is prevented by simply shifting the input binary data by 8 bits.

Selector 761 selects and outputs one of the outputs of color tone conversion unit 741 and shift register 751. This selection is switched by the output of region determining unit 770 which determines which of the line figure region and the pseudo-halftone region the region from which data is to be output belongs to. There are many known means for determining the region of the input binary image, and the present embodiment uses one of them.

The image selected by selector 761 is transferred to image display 750, such as a CRT, and displayed. As a result, a halftone image such as a color photograph may be stored as binary data and displayed as a halftone image. The density and chromaticity can be converted.

While in the present embodiment the example has been described in which the respective pieces of the binary data of the three planes are converted simultaneously, the respective planes can be converted sequentially by providing means for storing data temporarily. While the example in which the image is displayed on a CRT has been illustrated, the image can be output similarly to other output devices such as printers.

Many of color documents used in general businesses are described in black and one or two more colors; for example, documents with a red stamp or a document corrected in red. For these documents, the fact that they are described in black and other colors is important in itself and the colors are not required to be reproduced correctly. In many cases, the color plane becomes blank for a large part of a document, as mentioned above, so that high encoding efficiency is achieved when binary image is encoded and stored. Color information is input in a combination of three kinds of R-, G- and B-pieces of multivalue data. Therefore, any particular color portion can be extracted by designating the values of three kinds of R-, G- and B-colors indicative of the range of the particular color to be extracted beforehand. However, pixels, which rapidly change in color, such as the configuration of a line, do not express the natural color information accurately. This phenomenon is called ghost. It is difficult to determine a correct color for a pixel where ghost has occurred. In this case, it is necessary to determine a correct color by referring to the distribution of the colors of the nearby pixels.

In order to arbitrarily designate the range of hues to be extracted, it is important to designate a color in a color space which can be easily designated by human being, such as a VCH sequence or an L, a*, b*. Namely, it is necessary to use a color space close to the sensation of human beings and centered on chrominance. In this connection, it is possible to calculate the values of the R-, G- and B-system expressing the hue range designated by the VCH sequence, and to rewrite the portions to be determined to thereby designate any color in any width.

The confirmation of the result of the determination can be realized by expressing the image, for example, on a CRT, and by causing the operator to designate a re-inputting before storage of the data. In the display of an image, a color image is only required to be expressed on the basis of the result of the determination. However, in the case of a black and white CRT, the image can be expressed by blinking on and off portions to be extracted.

In the next embodiment, an image filing apparatus will be described which is capable of freely designating the range of a particular color to be extracted, in conformity to the choice of the operator when a multicolor document is to be stored in the mode (II) or designating a hue while confirming the result of the extraction.

Figure 21:
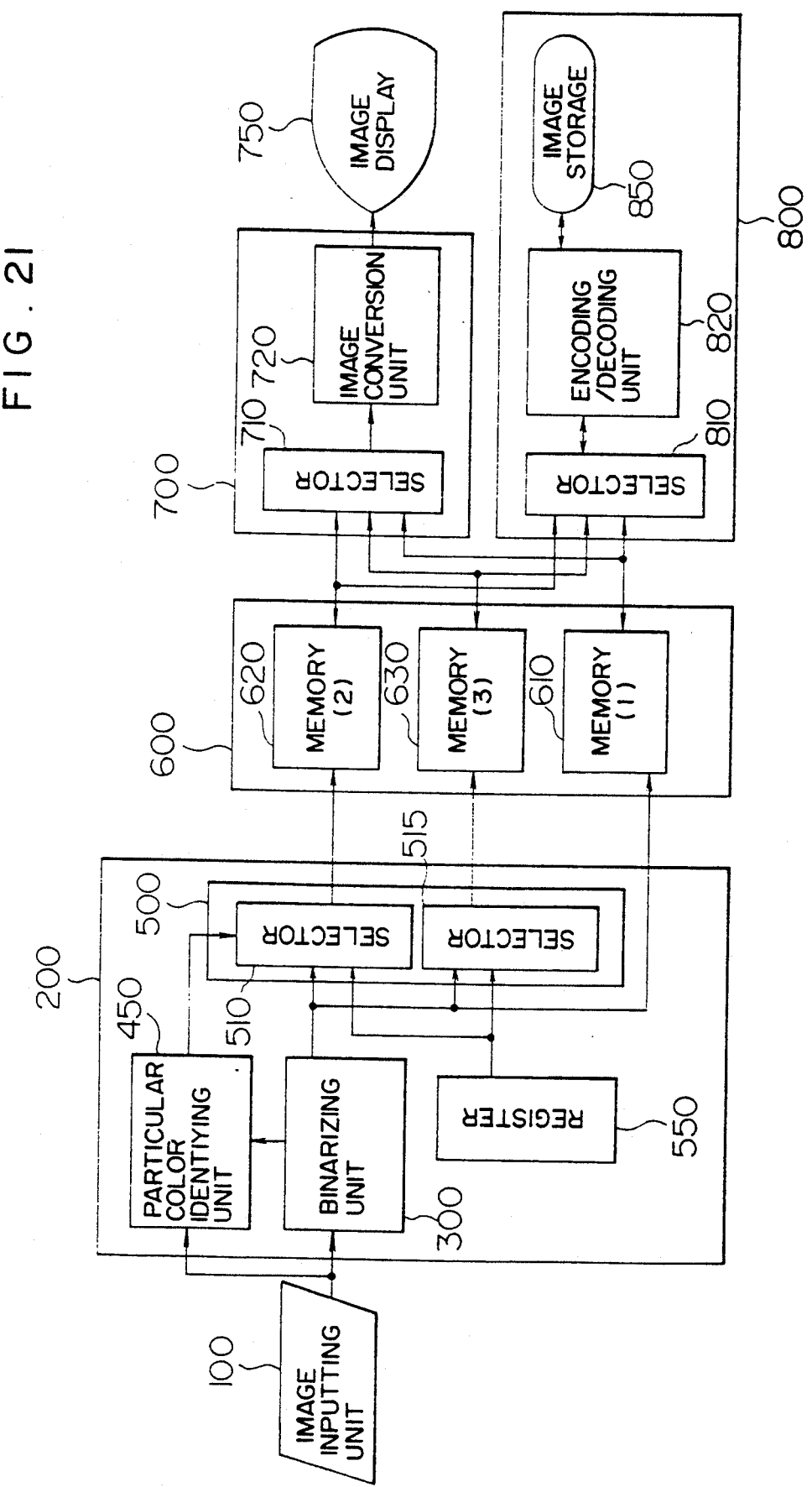
FIG. 21 is a block diagram explaining another embodiment of the image filing apparatus according to the present invention.

FIG. 21 shows a basic structure of the image filing apparatus. The basic structure is the same as that of the image filing apparatus of FIG. 8. In Fig. 21, a reference numeral 100 denotes an image input unit such as a color scanner which reads a color document, and outputs three kinds of R-, G- and B-pieces of multivalue image data; 200, an input data conversion unit which binarizes multivalue image data; 600, an image memory which stores binary image data temporarily and includes frame memories 610, 620, 630 (in FIG. 21, three memories are shown, but the number of memories varies depending on the number of particular colors to be extracted) which store two-four independent pieces or planes of binary image data. Reference numeral 700 denotes an output data conversion unit which outputs multivalue color image data from the R-, G- and B-binary image data; 750, an image display such as a CRT (Cathode Ray Tube) which displays a color image; 800, a data storage which encodes binary image data and stores the resulting data in a large capacity data storage 850 such as an optical disk. These elements are the same as those of the embodiments as mentioned above.

The features of the present embodiment reside in the structure of input data conversion unit 200, and more particularly, in a particular color identifying unit 450 which determines whether the color of each of the pixels of an image is a hue in a predetermined range. In input data conversion unit 200, a reference numeral 300 denotes a binarizing unit which receives R-, G- and B-pieces of multivalue data and outputs binarized image data; 510 and 515, a selector for selecting binarized data; and 550, a register for outputting a particular value at all times.

The R-, G- and B-pieces of multivalue image data output from image input unit 100 are inputted to binarizing unit 300, which calculates the luminance data from the R-, G- and B-pieces of data and stores the binary image luminance data in memory 610 of image memory 600. This luminance data may be approximated by the G-piece of data without calculating the luminance data.

The R-, G- and B-pieces of multivalue data are also input to particular color identifying unit 450, which determines whether the respective pixels express predetermined particular colors on the basis of the input R-, G- and B-pieces of data. The method of the determination will be described later in more detail.

The present embodiment is intended to discriminate a plurality of colors at the same time. As an example, discrimination of red and blue from other colors will be described. In this case, there are three kinds of results of determination for "red", "blue" and "others".

The output of particular color identifying unit 450, and the operations of selectors 510 and 515 will be described illustratively in FIG. 22.

FB/W, FLGR, and FLGB represent the outputs of particular color identifying unit 450. FB/W has the same value as the luminance data of the pixel handled, and after binarization, is "0" for a pixel to be expressed in white and "1" for a pixel to be expressed in black. FLGR denotes a red identifier which indicates whether a pixel concerned is red or not, and FLGB denotes a blue identifier which indicates whether the pixel handled is blue or not.

FLGR and FLGB are determined by the following conditions:

FLGR=1: the pixel to be handled="red" and FB/W=1

FLGB=1: the pixel to be handled="blue" and FB/W =1

Namely, in order that FLGR=1, it is required that the result of identifying a color be "red" and the result of binarizing luminance data be black.

Selectors 510 and 515 of FIG. 21 select data to be stored in memories 620 and 630 of image memory 600 in accordance with the output of particular color identifying unit 450 Register 550 always outputs "0". One example of image data to be stored in memories 610, 620, 630 of image data 500 are shown in FIG. 23. FIG. 23A shows an image of a monochromatic business document with a red stamp and a blue additional writing amendment. In Fig. 23A, a reference numeral 111 denotes the red stamp, and 121 and 122 each denotes a character region additionally written in blue.

FIGS. 23B, 23C and 23D show binary image data to be stored in three memories 610, 620, 630, respectively, when the document image is input to the present apparatus. FIG. 23B shows the image stored in memory 610 which is the result of binarizing the G-piece of data. If only this image data is used, a monochromatic binary image in the input document can be output: FIGS. 23C and 23D show pieces of the image data to be stored in, memories 620 and 630, respectively. Only those portions of the document written in red are stored in memory 620 and only the portions of the document written in blue are stored in memory 630.

The storage of image data includes encoding and storing the three pieces of the binary image data. The storage of the image data is the same as that of the multi-color document in mode (II) and a further description thereof will be omitted.

The structure of particular color identifying unit 450 which is the feature of the image filing apparatus according to the present embodiment will be described in detail below.

FIG. 24 shows the structure of particular color identifying unit 450 and its peripheral structure illustratively. In FIG. 24, reference numeral 210 denotes a particular color pixel extracting unit which determines whether the pixel concerned belongs to a predetermined range of hues from the relative relationship between the values of three kinds of R-, G- and B-pieces of multivalue image data for each pixel; and 440, a ghost canceller unit which removes the influence of a color ghost, to be described later, on the basis of the result of the determination made on each pixel.

The respective signal lines 101, 102 and 103 transmit R-, G- and B-pieces of multivalue data sent from the image input unit; 221, 222, 223 transmit FB/W, FLGR, FLGB indicative of the respective results of the determination; and 501 transmits image data comprising binarized luminance data. The results of the determination $FLGR_1$ and $FLGB_1$ output from signal lines 211 and 212 indicate whether the hue of the pixel concerned is within a predetermined range. However, the pixels determined, for example, as "red" include pixels to be handled as white after binarization because of high luminance even if the hue itself falls under the category of "red". Signals $FLGR_2$ and $FLGB_2$ indicative of only pixels whose binarized image data is "1", are outputted to ghost canceller unit 440, using gates 241, 242, while the structure of ghost canceller unit 440, described later in more detail, receives $FLGR_2$, $FLGB_2$ and binary image data and outputs "red" and "blue" identifiers FLGR 222 and FLGB 223.

Figure 25A:
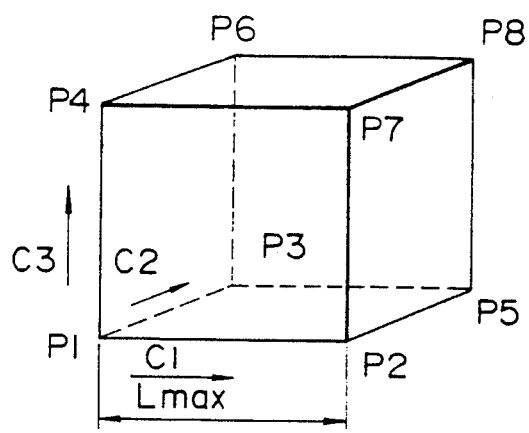
FIGS. 25a–25c illustrates one example of determination used in the particular color pixel extracting unit.

One example of the determination using particular color pixel extracting unit 210 will be described with reference to FIG. 25. FIGS. 25A-25C each denotes a space of colors expressed by multivalue image data. The color expressed by three kinds of R-, G- and B-pieces of multivalue image data can be expressed as coordinates in a cube shown in FIG. 25A. If let C1, C2 and C3 represent the R-, G- and B-values in FIG. 25A, P1 and P8 represent black and white, respectively. If R, G and B each is 8-bit pieces of data, each of C1, C2 and C3 is in a range of 0-255 and the maximum value Lmax is 255.

P2, P3 and P4 show three primary colors red, green and blue, respectively, and P5, P6 and P7 show their complementary colors yellow, magenta and cyan, respectively. Extraction of a particular color is achieved by developing the respective pixels of the input image in the coordinates of this space and extracting pixels belonging to a predetermined partial region.

Figure 25B:
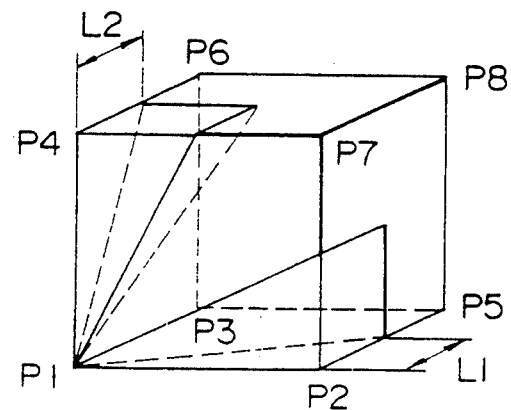
Figure 25C:
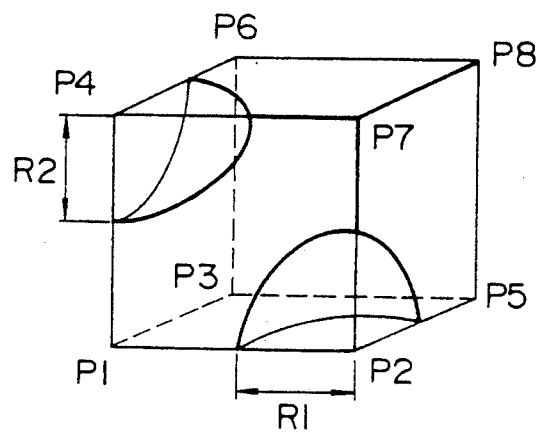

FIGS. 25B and 25C show two examples in the "red" and "blue" ranges. In FIG. 25B, $FLGR_1$ and $FLGB_1$ are outputted in accordance with the following expressions:

$$FLGR_1 = 1: R \geq G \times L1/L\max \text{ and } R \geq B \times L1/L\max$$
$$0: R < G \times L1/L\max \text{ or } R < B \times L1/L\max$$

$$FLGB_1 = 1: B \geq G \times L1/L\max \text{ and } B \geq R \times L1/L\max$$
$$0: B < G \times L1/L\max \text{ or } B < R \times L1/L\max$$

In FIG. 25C, $FLGR_1$ and $FLGB_2$ are output in accordance with the following equations:

$$FLGR_1 = 1: R1^2 \leq (L\max - R)^2 + G^2 + B^2$$
$$0: R1^2 > (L\max - R)^2 + G^2 + B^2$$

$$FLGB_1 = 1: R2^2 \leq R2^2 + G^2 + (L\max - G)^2$$
$$0: R2^2 > R2^2 + G^2 + (L\max - G)^2$$

Particular color pixel extracting unit 210, which realizes the input/output relationship, may be realized by a numerical value calculating unit or memory. For the memory, high speed processing is available, but a large amount of memory is required depending on the gradation of input image data. In this case, the quantity of memory can be reduced by making the determination using only the most significant one of the input data. Determination by the memory and interpolation by numerical calculation may be used together for the same purpose.

FIG. 26 shows one example of the contents of a memory used for realizing particular color pixel extracting unit 210. This example shows that the respective input R-, G- and B-pieces of data have a 4-bit gradation. It also shows the relationship between R, G and $FLGR_1$ where B is constant. Resetting the range of a color to be extracted is realized by rewriting the contents of the memory used as particular color pixel extracting unit 210.

If, generally, a user designates a particular color, it is difficult to directly designate the range of a color of interest in the RGB space. Therefore, if the range of a hue to be extracted is designated arbitrarily, operability is improved by designating the color in a color space close to the choosing of the user.

Figure 27A:
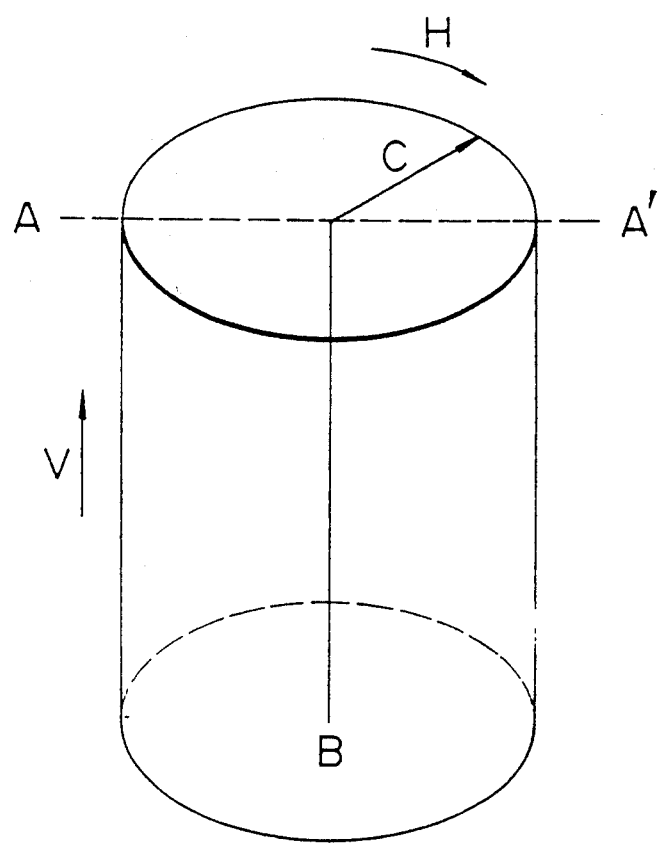
FIGS. 27A–27C illustrates the principles of determination using a VCH system as a color expression system.
Figure 27B:
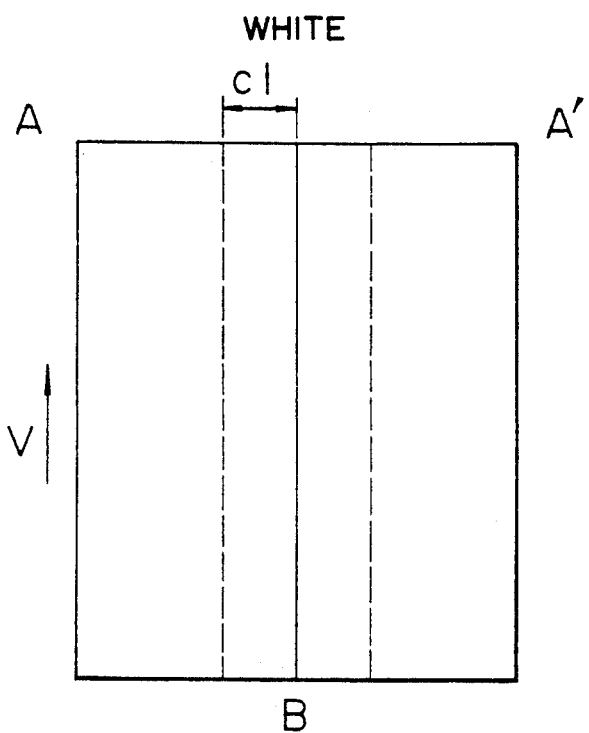
Figure 27C:
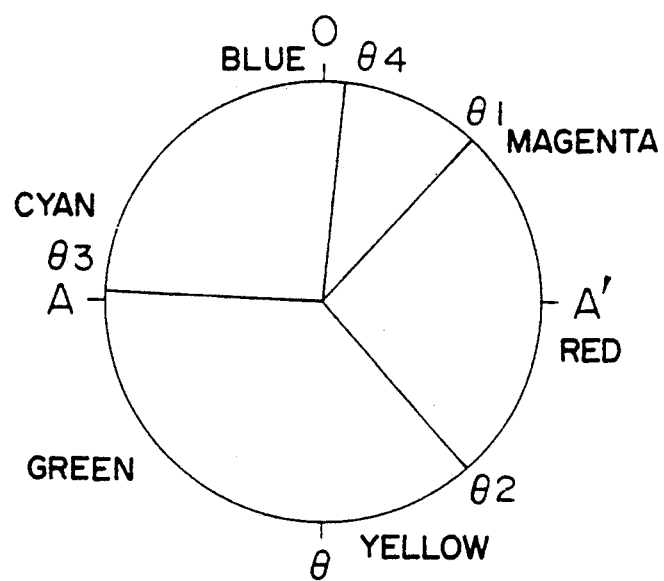

FIGS. 27A-27C show the principles of determination using a VCH sequence as an example of a color space. The VCH sequence expresses a color using luminance V, saturation C and hue H. Conversion from the RGB system to the VCH sequence is achieved, for example, by the following equations:

$$V = 0.299\,R + 0.287\,G + 0.114\,G$$

$$C = V\sqrt{\{(R - V)^2 + (B - V)^2\}}$$

$$H = \tan^{-1}\{(R-V)^2+(B-V)^2\}$$

Saturation $C_1$ shows a threshold used to discriminate between color and monochrome, hues $-1$ and $\theta_2$ show the range of a hue expressing red, and $\theta_3$ and $\theta_4$ show the range of a hue expressing blue. By controlling the saturation threshold $C_1$ and hue thresholds $\theta_1$, $\theta_2$, $\theta_3$ and $\theta_4$, the color of an image to be extracted can be set to any desired one.

This color space is used widely to express colors in prints, and the standards of vermilion inkpad and stamp ink are expressed in the present system. Therefore, in a system which handles documents, external designation of a color is performed by this color space and internal processing is performed by the RGB system as in the image data. Thus a system which makes a color designation is easily realized.

In order to realize this function, means which converts the range of the color designated in the VCH sequence to that of the RGB system must be provided.

Figure 28:
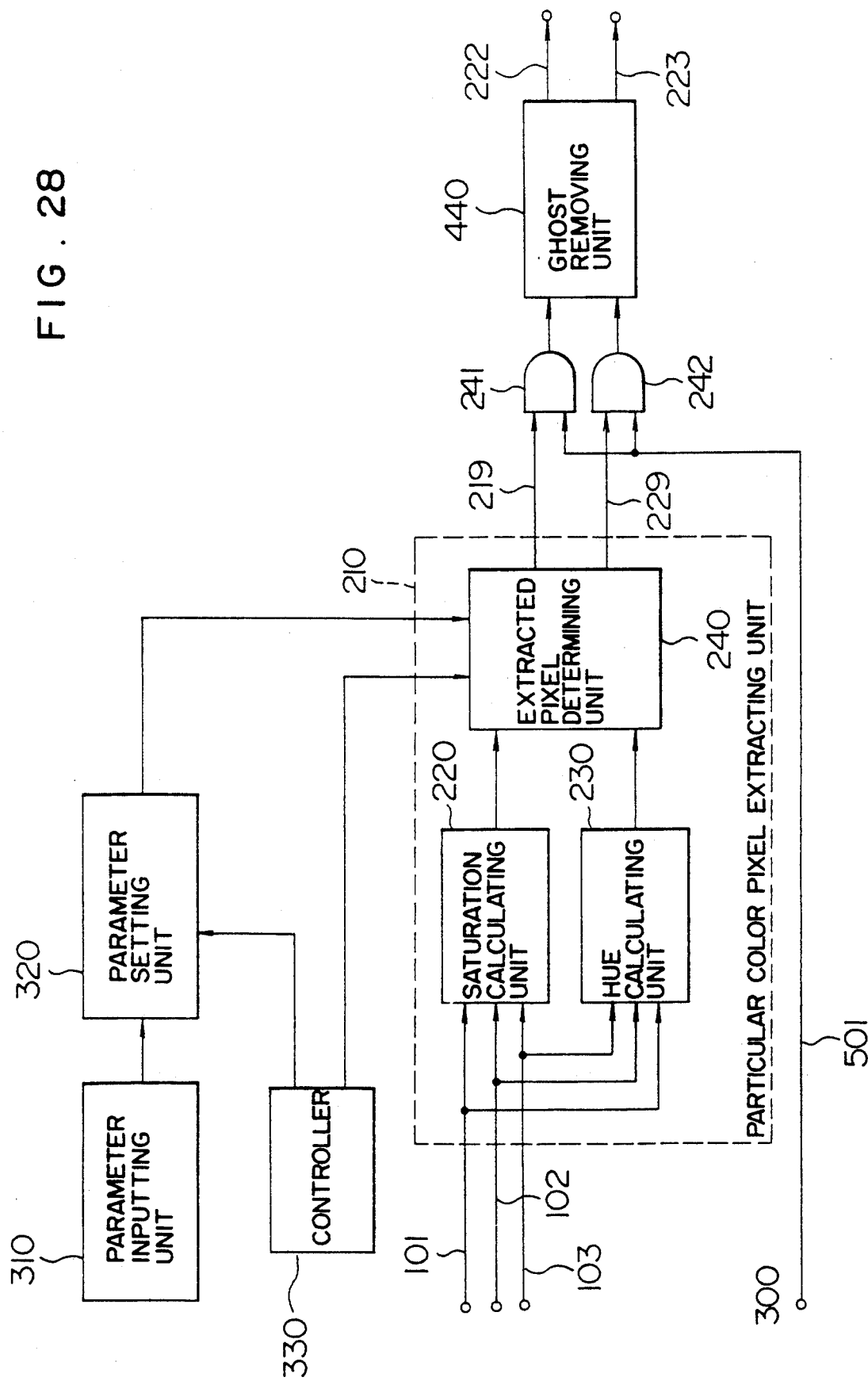
FIG. 28 shows an embodiment of the image filing apparatus according to the present invention and illustrates the detailed particular color pixel extracting unit which is capable of optionally designating the ranges of colors to be extracted.

FIG. 28 shows one illustrative structure of particular color pixel extracting unit 210 for an image filing apparatus having the function of arbitrarily setting the range of a color to be extracted. In FIG. 28, a reference numeral 310 denotes a parameter inputting unit for externally designating the range of a color to be extracted; 320 denotes a parameter setting unit which calculates the inside of extracted pixel determining unit 240 from the input parameters; and 330 denotes a controller which controls the writing of data from the parameter setting unit to extracted pixel determining unit 240.

Particular color pixel extracting unit 210 includes an extracted pixel determining unit 240, a saturation calculating unit 220 and a hue calculating unit 230. Saturation determining unit 220 and hue determining unit 230 each is a converter which receives three kinds of R-, G- and B-pieces of multivalue data and outputs multivalue saturation data C and hue data H.

While conversion from the RGB system to the VCH sequence is performed by the operation using the above equations, it may be further easily realized by using a memory. If the number of gradations of input RGB data is large, the scale of the memory becomes immensely large. In that case, the most significant bits of the data are input. In order to avoid a reduction in the number of gradations, it is possible to interpret the least significant bits by operation.

The outputs of saturation extracting unit 220 and hue calculating unit 230 are C (x, y) and H (x, y), respectively, when RGB data of pixel P (x, y) is received. Extracted image determining unit 240 compares saturation C (x, y) and hue H (x, y) with the respective thresholds $C_1$, $\theta_1$, $\theta_2$, $\theta_3$ and $\theta_4$ to determine and output the results of the determination $FLGR_1$ and $FLGB_1$, for example, in accordance with the following equations:

$FLGR_1 = C(x, y) \geq C_1$ and $\theta_1 \leq H(x, y) \leq \theta_2$ $FLGB_1 = C(x, y) \geq C_1$ and $\theta_3 H(x, y) \leq \theta_4$ In order to set the range of pixels to be extracted, thresholds Cl, 8 8 83 and 84 are input through parameter input unit 310. Parameter setting unit 320 calculates the contents of the memory to be recorded in extracted pixel determining unit 240, using the input thresholds $C_1$, $\theta_1$, $\theta_2$, $\theta_3$, $\theta_4$, and the results are transferred to extracted pixel determining unit 240 under control of controller 330. As a result, a pixel to be extracted can be arbitrarily set.

Also in this case, extraction of unnecessary pixels can be avoided by taking the logical product or AND operation of the output of extracted pixel determining unit 240 and the result of binarization FB/W as in the determination by the RGB data mentioned above. As a result, $FLGR_2$ and $FLGB_2$ are input as results of the determination to ghost canceller unit 400.

Figure 29:
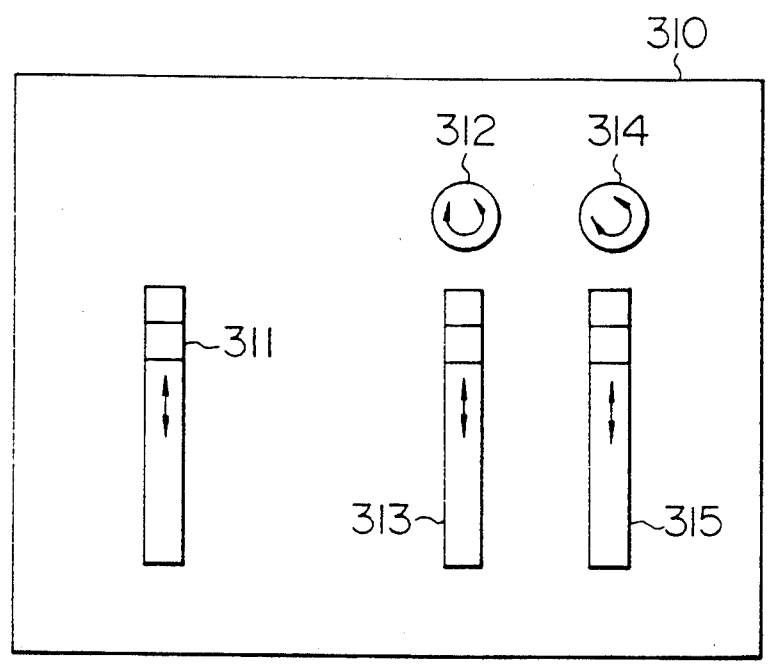
FIG. 29 illustrates one structure of a parameter input unit.

Since five kinds of thresholds are arbitrarily set by the operator in parameter input unit 310, it is important to express the respective thresholds in the form close to the choosing of the operator. FIG. 29 shows one example of parameter input unit 310. In FIG. 29, reference numeral 311 denotes a slide switch which sets the threshold $C_1$ of a saturation, which can be set by itself. Reference numeral 312 denotes a dial used to input the center $H_1$ of the range of a hue to be set as red, and reference numeral 313 denotes slide switch which inputs the width $Hb_1$ of a hue to be extracted. Thresholds $\theta_1$ and $\theta_2$ are determined using $H_1$ and $Hb_1$ in accordance with the following equations:

$\theta_1 = H_1 - Hb_1$ $\theta_2 = H_1 + Hb_1$

Similarly, the range of blue is set by dial 314 and slide switch 315. If the two designated hues overlap, for example, $\theta_2 \geq \theta_3$, the central point is used as a boundary or one of the hues is handled preferentially, when required. By setting $\theta$ so as to include all the hues in the designation of a hue, particular color identifying unit 450 may be used as the color/monochrome identifying unit 410.

Subsequently, the structure of ghost canceller unit 440 will be described in detail. Color ghost is a phenomenon where a color which is not naturally present occurs in the result of the determination due to deviations of the R-, G- and B-positions, one from the other, in the input unit and due also to the difference between the photoelectric conversion characteristics. For example, it is to determine as red or blue the pixels of the contour of a black character o the background of white.

Cancellation of a ghost is realized by correcting the result of the determination of the central pixel using a pattern indicative of the result of the determination on pixels in the vicinity of the central pixel. For example, a ghost occurring between successive white and black pixels can be corrected by viewing the result of the determination on every two adjacent pixels in each of the vertical and horizontal directions.

Figure 30:
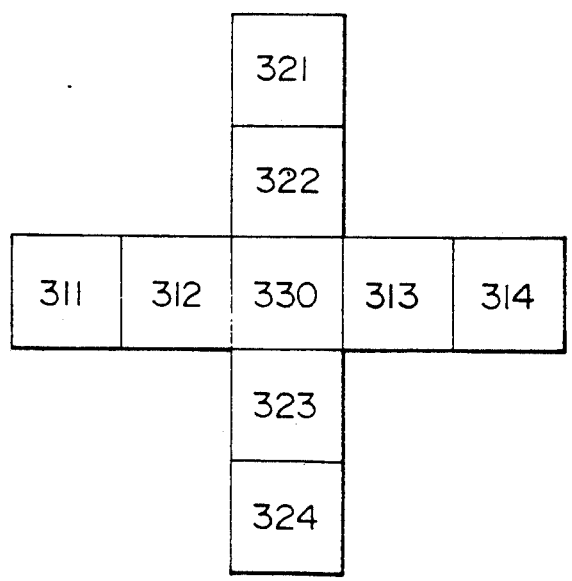
FIG. 30 illustrates the layout of pixels referred to by a ghost canceler unit.

An example in which the result of the determination of every two adjacent pixels in each of the vertical and horizontal directions is referred to will be described. At this time, the pixels to be referred to are nine pixels shown in FIG. 30 and three kinds of pieces of data $FLGR_2$, $FLGB_2$, and FB/W are used. Reference numeral 330 denotes a pixel which outputs the final determination.

Figure 31:
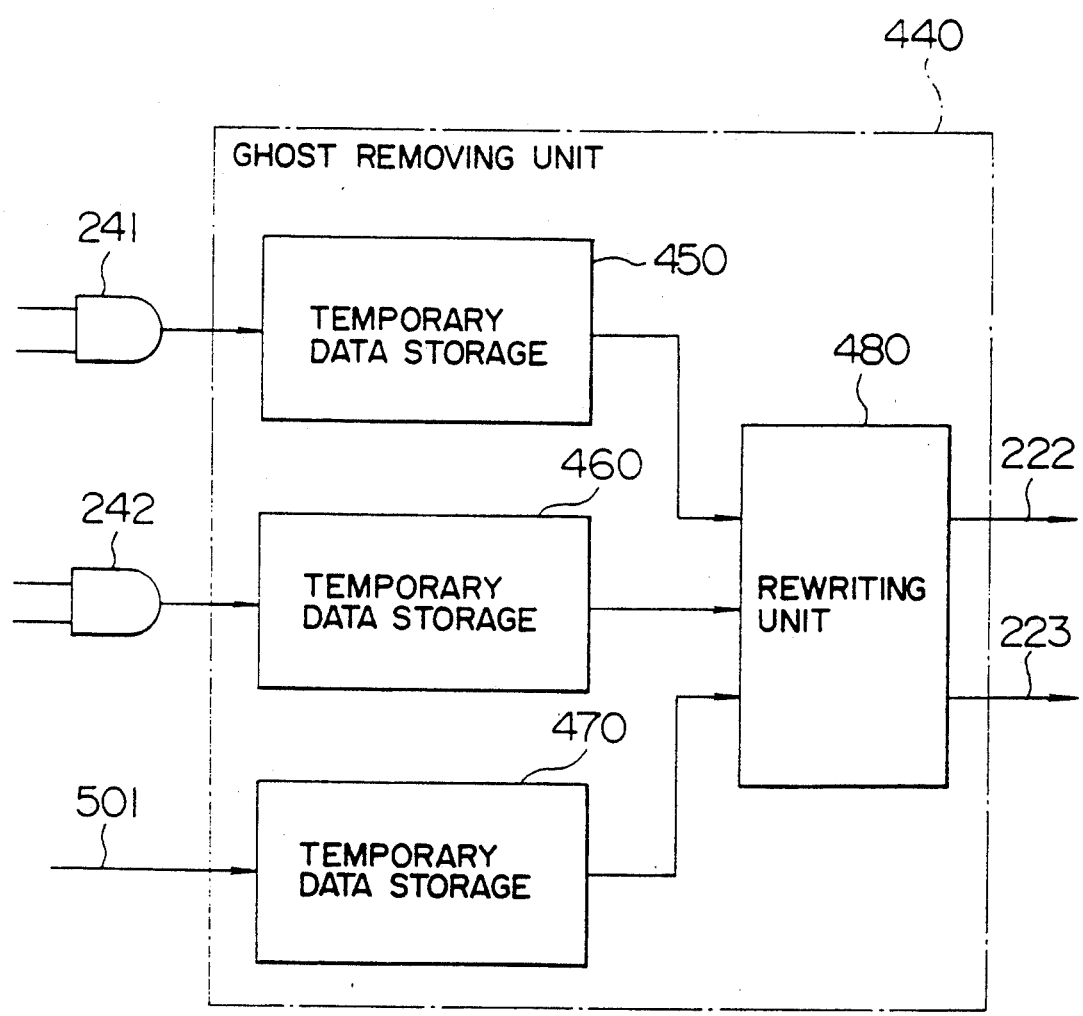
FIG. 31 illustrates one structure of the ghost canceler unit.

FIG. 31 shows an illustrative structure of ghost canceller unit 440. In FIG. 31, reference numerals 450, 460 and 470 denote temporary data storages which temporarily store $FLGR_2$, $FLGB_2$, and FB/W and simultaneously output pixels required for determination, nine pixels by nine pixels; and 480 denotes a ghost rewriting unit which provides the result of the final determination from binary data for the input 27 bits.

Figure 32:
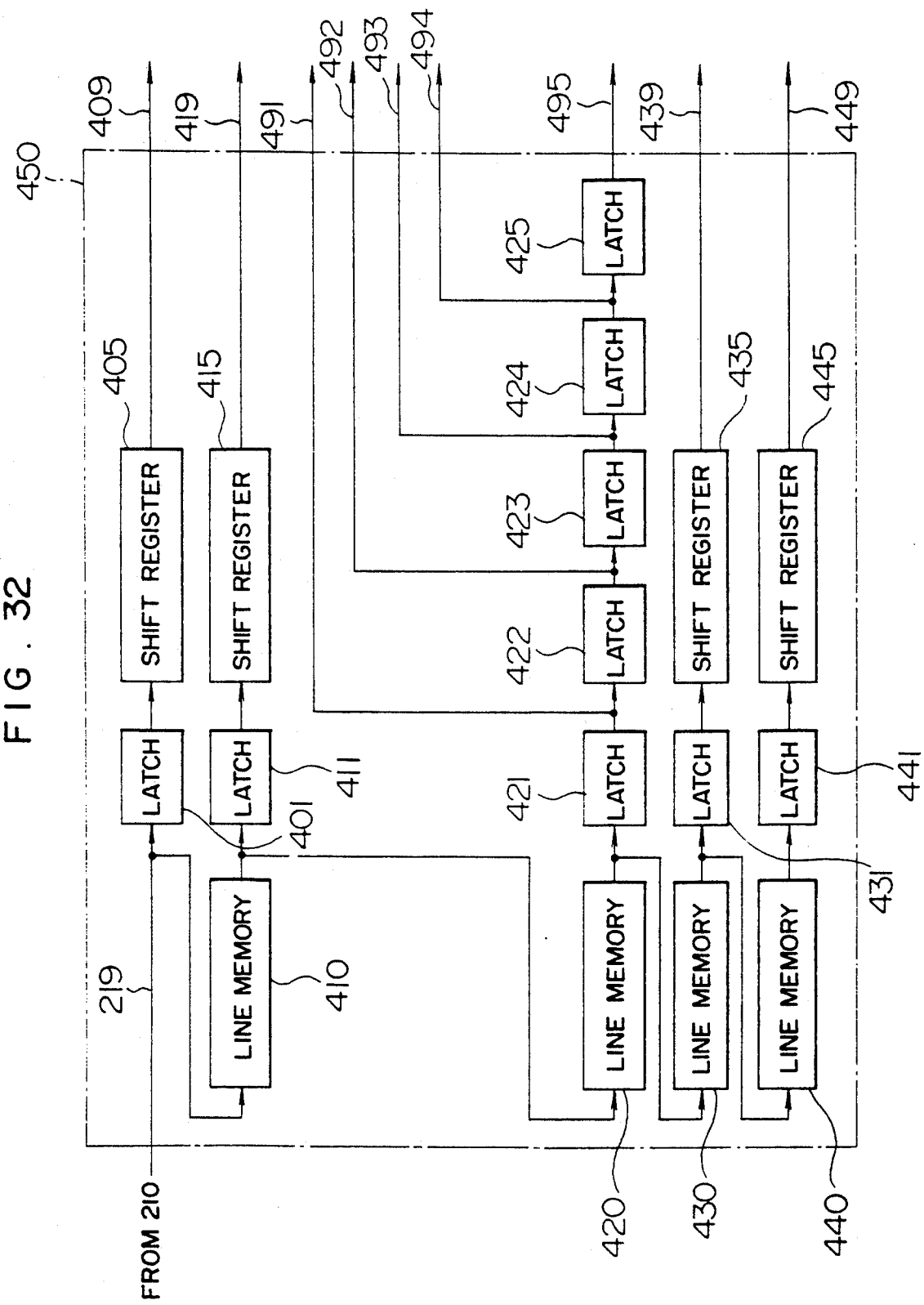
FIG. 32 shows one illustrative structure of a temporary data holding unit.
Figure 33A:
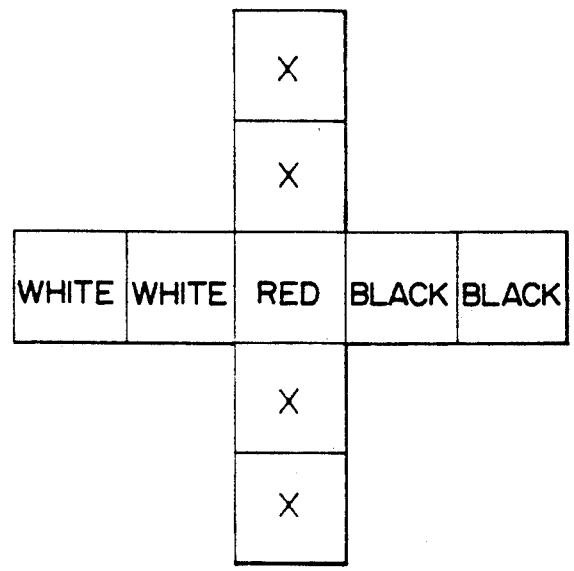
FIGS. 33A–33D each shows a pattern occurring when a red ghost appears.
Figure 33B:
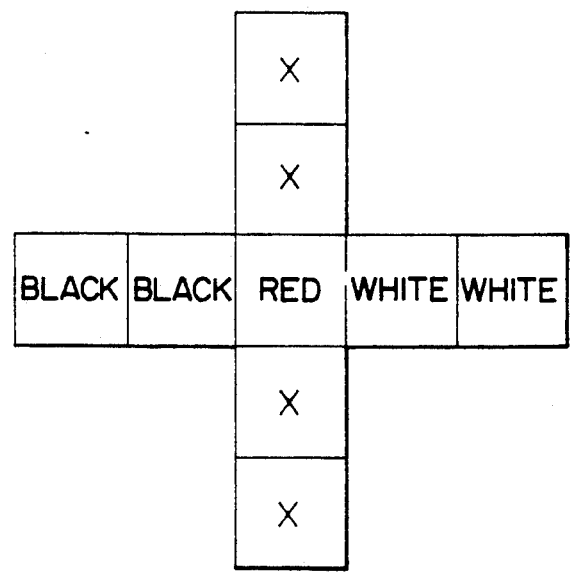
Figure 33C:
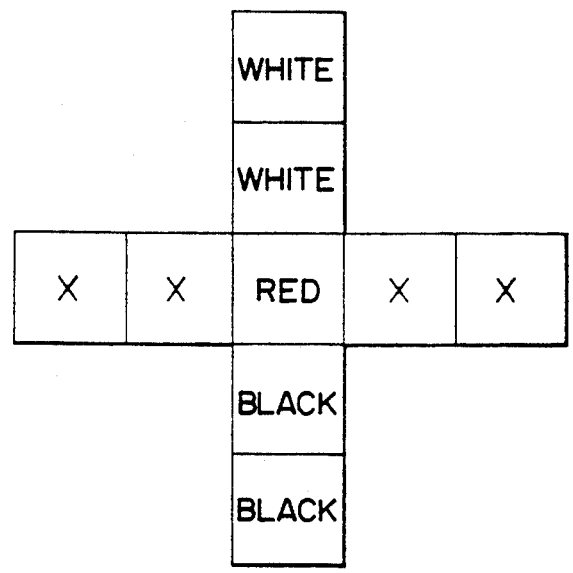
Figure 33D:
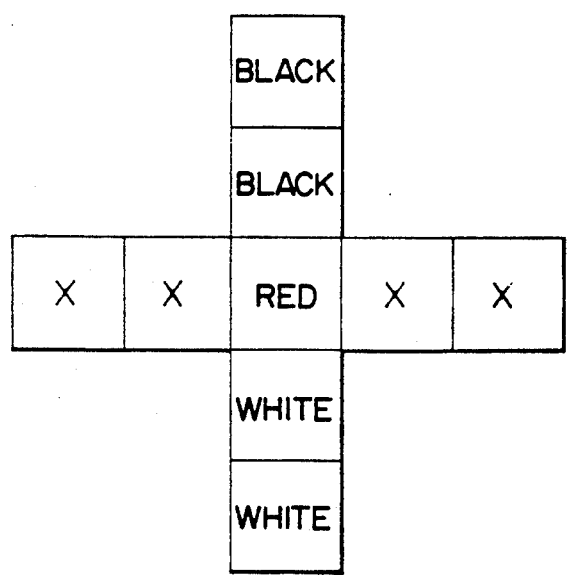

The elements 450, 460, 470 can be realized so as to have the same structure. FIG. 32 shows one illustrative structure of temporary data storage 450. In FIG. 32, a reference numeral 219 denotes a signal line through which $FLGR_2$ is inputted by particular color pixel extracting unit 210; 401, 411, 421, 431, 441 and 422, 423, 424, 425 denotes a latch; 405, 415, 435, 445 denotes a shift register to time input data; and 410, 420, 430, 440 denotes a line memory which stores data on an input image for one scanning line. If signal $FLGR_2$ (x+2, y+3) is received from signal line 219, latches 401, 411, 431, 441 output $FLGR_2$ (x+2, y+2), $FLGR_2$ (x+1, y+2), $FLGR_2$ (x−1, y+2), $FLGR_2$ (x−2, y+2), and latches 421, 422, 423, 424, 425 output $FLGR_2$ (x+2, y), $FLGR_2$ (x+1, y), $FLGR_2$ (x−1, y), $FLGR_2$ (x, y), $FLGR_2$ (x−2, y). Shift registers 405, 415, 435, 445 output $FLGR_2$ (x, y+2), $FLGR_2$ (x, y+1), $FLGR_2$ (x, y−1), $FLGR_2$ (x, y−2).

Provision of three like circuits permits each of $FLGB_2$, FB/W to simultaneously output data for nine pixels.

Rewriting unit 480 in FIG. 31 determines the results of the determination FLGR, FLGB on the central pixel on the basis of the input 27-bit binary data. If the number of pixels to be referred to is small, ghost rewriting unit 480 may be realized by a memory. One example of removing a ghost using logical circuits will be described herein.

If the rewriting conditions are now determined as "red having a width equal to that of one pixel and present between two or more successive white pixels and two or more successive black pixels", four kinds of patterns shown in FIGS. 33A–33D are handled. While in the present embodiment only the example in which the pixel where $FLGR_2 = 1$ is received and FLGR = 0 is output has been described, FLGB = 1 can be output when $FLGB_2 = 0$ is received using a similar structure. If a hue to be extracted is set so as to include all the hues using either $\theta_1$ and $\theta_2$ or $\theta_3$ and $\theta_4$ when the hue to be extracted is designated, this ghost removing unit may be intactly applicable in the above-mentioned color/monochrome identification.

Subsequently, confirmation of the result of the determination will be described. If a display which can express a color image such as a color CRT is connected to the system, the result of the determination can be determined by display of a color binary image to be stored. However, ascertaining the result of the determination is realized by blinking the pixel portions to be extracted even if the connected display is of a black and white display type.

Figure 34:
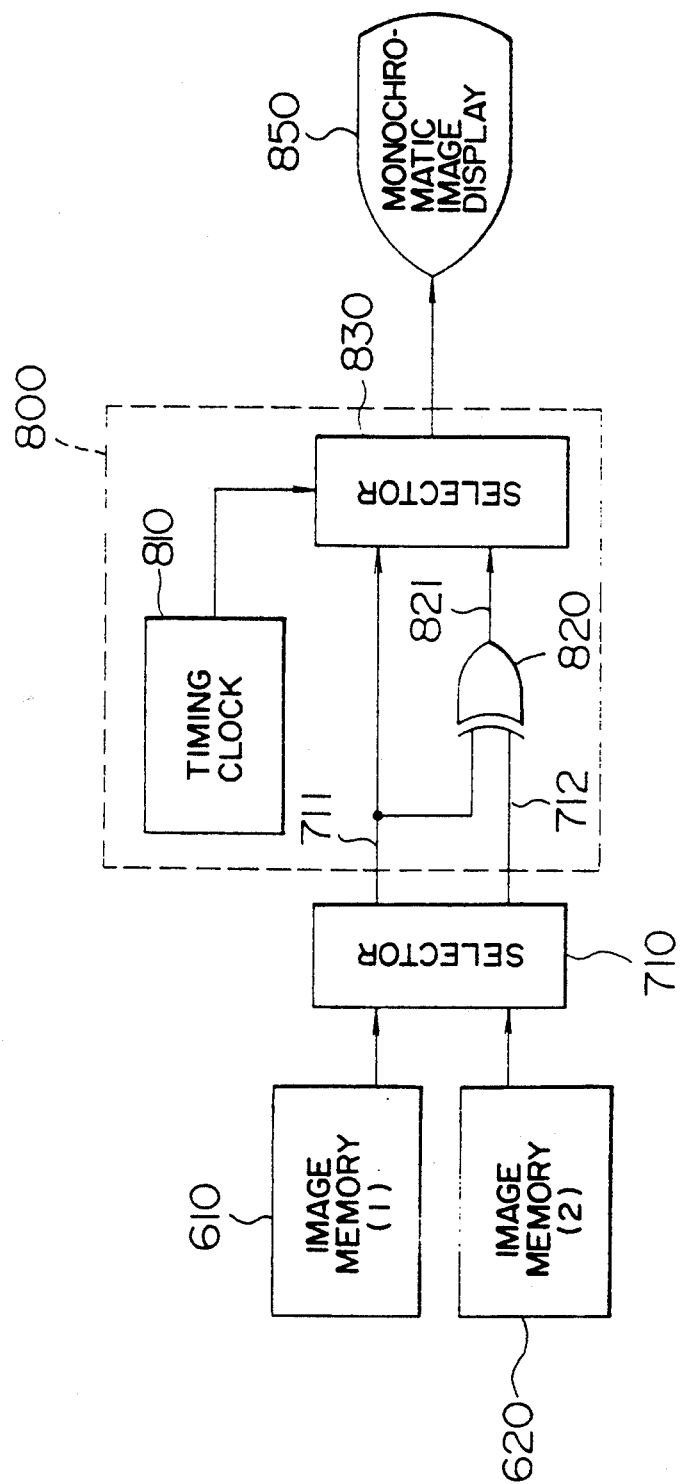
FIG. 34 shows one illustrative structure for carrying out an image blinking display function to confirm the result of the determination by a black and white display.

FIG. 34 shows one illustrative structure of a device for confirming the result of the determination using a monochromatic display. For simplicity, an example in which a pixel which has been determined as red is blinked will be described. In FIG. 34, a reference numeral 800 denotes an image converter which creates a display picture from three pieces of binary image data; 810 denotes a clock which controls the timing of blinking; 820 denotes a logical element which performs an exclusive-OR operation, and 830 denotes a selector which select two kinds of input data. The input data are the luminance data and the red plane data stored in memories 610 and 620, respectively.

When an image is displayed, binary data on the luminance is output from signal line 711 and an image excluding the pixel portions determined as being red from the binary data is output from signal line 821 by selection of selector 710. Selector 830 alternately switches and displays those two kinds of binary image data under control of clock 810.

In order to express and store a color document in black and one or two other particular colors in the present embodiment, extraction of pixels expressed in particular colors from a document image has been previously described. However, a color document can be efficiently stored similarly by externally designating that portion of the image to be described in a particular color although it is not expressed really in a particular color. In this case, the region of the image to be expressed as the particular color is designated externally, so that it may dispense with the particular color extracting unit.

Figure 35:
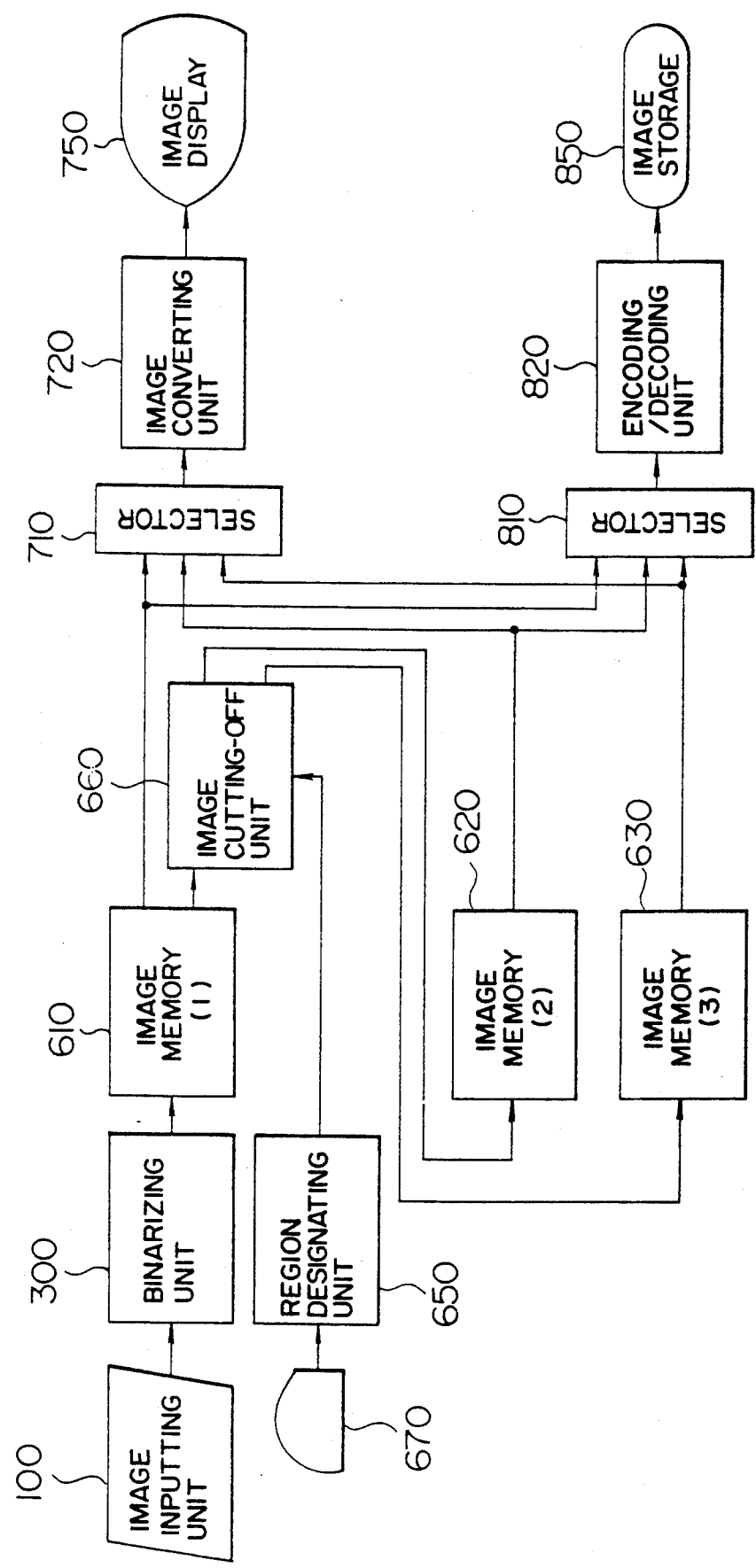
FIG. 35 shows an embodiment of the image filing apparatus according to the present invention and a illustrative structure of the image filing apparatus which can designate a colored portion on an external command.

FIG. 35 shows one illustrative structure of an image filing apparatus used in this case. In FIG. 35, reference numeral 670 denotes a well-known coordinate designating unit such as a mouse; 650 denotes a region designating unit which reads the coordinates of a region designated by coordinate designating unit 670; and 660 denotes an image cutting-off unit which reads from image memory 610 image data in the region designated by region designating unit 650 and transfers it to image memory 620 or 630.

The document is input as multivalue image data from image unit 100, binarized, recorded in image memory 660, and simultaneously displayed on image display 750. The operator designates any region with a mouse on the basis of the position of mouse and the image displayed on image display 750. The coordinates of the region designated by the mouse are read by region designating unit 650. Image cutting-off unit 660 reads from image memory 610 the contents of the luminance image data corresponding to the designated region and copies the data into image memory 620 or 630. As a result, the color document image can be recorded by manual operation without using a special color extracting function.

When a document having a unified form is continuously input by reserving the coordinates of the designated region in the present embodiment, the respective documents can be input continuously in the region designated once.

Also, by designating the portions to be colored in a particular color when a black and white document image is input, the designated portions can be stored as a color plane.

We claim:

1. An image filing apparatus comprising:
   input means for inputting, as multivalue data, an image corresponding to a document to the apparatus;
   input data converting means for converting said multivalue data to binary data, said input data converting means comprising:
   region determining means, having at least color identifying means, for extracting a region of pixels to be expressed in a particular color contained in the image from said multivalue data;
   binarizing means for binarizing luminance data of the image inclusive of said region of pixels to be expressed in said particular color from said multivalue data, and
   selection means for selecting an output of said binarizing means in accordance with an output of said region determining means;

image memory means for storing said binary data temporarily, said image memory means comprising:

first memory means for storing as a first plane said binarized luminance data (Y: Gc/Gd) inclusive of said region of pixels to be expressed in said particular color, and second memory means for storing as a second plane said binarized luminance data of said region of pixels to be expressed in said particular color;

image storing means for encoding and storing said binary data stored in said image memory means, decoding said stored data in a decoded data and outputting said decoded data to said image memory means;

output data converting means for outputting desired image data based on said binary image data in said image memory means; and image display means for displaying a desired image based on image data from said output data converting means.

2. An image filing apparatus according to claim 1, wherein said binarizing means includes binarizing processing means for binarizing the multivalue data with a predetermined threshold and dithering means for subjecting the multivalue data to pseudo-halftone processing and binarizing the result of their pseudo-halftone processing.

3. An image filing apparatus according to claim 2, wherein said region determining means includes character/photograph region determining means for determining which of a character region and a photograph region each of portions of the image belongs to; and said selection means selects one of the outputs of said binarizing means and the output of said dithering means as the luminance data stored as the first plane in accordance with the output of the character/photograph determining means.

4. An image filing apparatus according to claim 3, wherein said selection means selects one of the outputs of the binarizing means and the dithering means as the luminance data to be stored as the second plane for the region of the pixel to be expressed in the particular color in accordance with the output of the character/photograph region determining means, and selects "0" for regions other than the pixel to be expressed in the particular color irrespective of the output of the character/photograph region determining means.

5. An image filing apparatus according to any one of claim 1, wherein said color identifying means comprises:

particular color pixel extracting means for receiving three kinds of R-, G- and B-pieces of multivalue data as the multivalue data and determining whether a relevant pixel is a pixel to be expressed in the particular color from the relative relationship between the values of the R (red)-, G (green)- and B (blue)-pieces of multivalue data; and ghost removing means for rewriting the result of said determination on the relevant pixel on the basis of a combination of the result of the determination by said particular color pixel extracting means on pixels in the vicinity of each relevant pixel and the binary luminance data obtained from the binarizing means.

6. An image filing apparatus according to claim 5, wherein said color identifying means further comprises:

parameter inputting means for externally designating said particular color and the range of its hue; and parameter setting means for converting said color designated by said parameter inputting means to a three-primary color RGB system.

7. An image filing apparatus according to claim 6, wherein said particular color pixel extracting means comprises:

saturation calculating means for calculating a saturation from the three kinds of R-, G- and B-pieces of multivalue data;

hue calculating means for calculating a hue from the three kinds of R-, G- and B-pieces of multivalue data; and extracted pixel determining means for comparing the calculated saturation and hue with the outputs of said parameter setting means and determining whether a relevant pixel is one to be expressed in said particular color.

8. An image filing apparatus according to any one of claim 1, wherein said image storage means includes data storage for storing data in said first and second planes in the order in which the data in said first plane can be read first when required.

9. An image filing apparatus according to any one of claims 1, wherein said image display means displays said binary data in said first plane as a black and white image.

10. An image filing apparatus according to any one of claim 1, wherein said inputting means includes a color scanner for receiving an image corresponding to the document as three kinds of R-, G- and B-pieces of multivalue data.

11. An image filing apparatus according to claim 10, wherein said luminance data includes the binary outputted from the binarizing means corresponding to the G-piece of multivalue data.

12. An image filing apparatus according to claim 10, wherein said region determining means includes color/monochrome identifying means for determining whether each of the pixels of the input image is a monochromatic region described in black and white or a color region containing color data;

said image memory means further includes a third memory means; and said selection means selects an output comprising a dithered version of the three kinds of R-, G- and B-pieces of multivalue data of the pixel determined as a color region by said color/monochrome identifying means and obtained by pseudo-halftone processing of said binarizing means and outputs the dithered output to said first, second and third memories.

13. An image filing apparatus according to claim 12, wherein said selection means determines which of the character region and the photograph region a pixel, which has been determined as being the monochromatic region by the color/monochrome identifying means, belongs to, selects an output comprising a dithered version of the three kinds of R-, G- and B-pieces of multivalue data of the pixel belonging to the photograph region and obtained by pseudo-halftone processing of said binarizing means and outputs the dithered output to said first, second and third memories.

14. An apparatus according to claim 13, wherein said selection means selects a binarized version of the G-piece of multivalue data of a pixel of an image belonging to the character region and outputted from said binarizing means, the image being mode designated as a full color document, and outputs the same binarized version to said first, second and third memory means.

15. An apparatus according to claim 13, wherein said selective means selects a binarized version of the G-piece of multivalue data of a pixel of an image belonging to the character region and outputted from said binarizing means, the image being mode designated as a document which contains a monochromatic region and a color region, outputs the binarized version to said first memory means and outputs "0" to said second and third memory means.

16. An image filing apparatus according to claim 15, wherein said image memory means includes fourth memory means for storing the result of the identification by said color/monochrome identifying means for the image being mode designated as a document which contains a monochromatic region and a color region.

17. An image filing apparatus according to any one of claim 1, wherein said output data converting means comprises:
a selector for selecting desired data from the binary data stored in said image memory means; and
multivalue forming means for producing multivalue image data for each color from the data outputted from said selector.

18. An image filing apparatus according to claim 17, wherein said image display means synthesizes multivalue image data of the respective colors produced by said multivalue forming means and displays the resulting multivalue color image data.

19. An image filing apparatus according to claim 17 or 18, wherein said multivalue forming means comprises:
means for determining which of the character region and the photograph region a relevant pixel belongs to, using binary data from said selector;
means for generating multivalue image data on the basis of the binary data outputted from said selector;
means for shifting the binary data from said selector; and
means for selecting one of the outputs of the multivalue image data generating means and the shifting means in accordance with the result of the determination by said determining means.

20. An image filing apparatus according to any one of claim 1, wherein said output data converting means comprises:
means for performing an exclusive-OR operation on the binary luminance data stored as a first plane in said image memory means and the binary luminance data in the region of pixels to be displayed in the particular color and stored in a second plane in said image memory means; and
means for alternately selecting the calculated binary image and the binary image of the luminance data.

21. An image filing method comprising the steps of:
inputting as multivalue data an image corresponding to a document;
converting said multivalue data to binary data, said converting step comprising the steps of:
determining a region including at least a color identifying step of extracting from the multivalue data the region of a pixel to be expressed in a particular color contained in the image, binarizing luminance data of the image inclusive of the region of pixel to be expressed in said particular color form said multivalue data, and
selecting said binarized luminance data in accordance with the result of the region extraction;
temporarily storing in image memory means as a first plane said binarized luminance data inclusive of the region of pixel to be expressed in said particular color, and as a second plane said binarized luminance data of the region of pixels to be expressed in said particular color; and
encoding the binary data stored in said image memory means and storing the encoded binary data in a data storage.

22. An image filing method according to claim 21, comprising the steps of:
decoding the encoded binary data stored in said data storage and outputting he decoded data to said image memory means;
converting the binary image data in said image memory means to desired image data and outputting the same; and
displaying a desired image on the basis of said desired image data.

23. An image filing method according to claim 21 or 22, wherein said binarizing step includes a simple binarizing step of binarizing said multivalue data with a predetermined threshold and a dithering step of binarizing said multivalue data through pseudo-halftone processing.

24. An image filing method according to claim 23, wherein said region extracting step includes a character/photograph region determining step of determining which of a character region and a photograph region each of portions of the image belongs to; and
said selecting step selects one of the results of the simple binarization and said dithering as the luminance data stored as said first plane in accordance with the result of the character/photograph region determination.

25. An image filing method according to claim 24, wherein said selecting step selects one of the results of said simple binarization and said dithering as the luminance data to be stored as said second plane for the region of pixel to be expressed in the particular color in accordance with the result of the character/photograph region determination, and selects "0" for regions other than the pixel to be expressed in the particular color irrespective of the result of the character/photograph region determination.

26. An image filing method according to any one of claims 21-25, wherein said color identifying step comprises:
a particular color pixel extracting step of receiving three kinds of R-, G- and B-pieces of multivalue data as said multivalue data and determining whether said relevant pixel is the pixel to be expressed in said particular color from the relative relationship between the values of the R-, G- and B-pieces of multivalue data; and
a ghost removing step of rewriting the result of the determination on said relevant pixel on the basis of a combination of the result of the particular color pixel extraction on pixels in the vicinity of each particular pixel and the binary luminance data obtained by said binarizing step.

27. An image filing method according to claim 26, wherein said color identifying step further comprises:

a parameter inputting step of externally designating said particular color and the range of its hue; and a parameter setting step of converting the color designated by the parameter inputting step to a three primary color RGB system.

28. An image filing apparatus method to claim 27, wherein said particular color pixel extracting step comprises:

a saturation calculating step of calculating a saturation from the three kinds of R-, G- and B-pieces of said multivalue data;

a hue calculating step of calculating a hue from the three kinds of R-, G- and B-pieces of said multivalue data; and an extracted pixel determining step of comparing the calculated saturation and hue with the result of said parameter setting step and determining whether the pixel is one to be expressed in said particular color.

29. An image filing method according to any one of claim 21, wherein said image storaging step includes storing in data storage the data of said first and second planes in the order in which the data in said first plane can be read first when required.

30. An image filing method according to any one of claim 21, wherein said image display step includes display of said binary data in said first plane as a black and white image.

31. An image filing method according to any one of claim 21, wherein said inputting step includes inputting an image corresponding to the document as three kinds of R-, G- and B-pieces of the multivalue data.

32. An image filing method according to claim 31, wherein said luminance data used includes the result of the binarization corresponding to the G-piece of the multivalue data.

33. An image filing method according to claim 31, wherein said region determining step includes a color/monochrome identifying step of determining whether each of the pixels of said input image is a monochromatic region described in black and white or a color region containing color data; and said selecting step selects a dithered version of the three kinds of R-, G- and B-pieces of said multivalue data of the pixel determined as a color region by the result of the color/monochrome identification means and obtained by pseudo-halftone processing of said binarizing step and outputs the dithered output to said first, second and third memories.

34. An image filing method according to claim 33, wherein said selecting step determines which of the character region and the photograph region a pixel, which has been determined as being the monochromatic region by said color/monochrome identifying step, belongs to, selects a dithered version of the three kinds of R-, G- and B-pieces of the multivalue data of the pixel belonging to the photograph region and obtained by pseudo-halftone processing of said binarizing step and outputs the dithered output to said first, second and third memories.

35. An image filing method according to claim 34, wherein said selecting step selects the result of simple binarization, with a predetermined threshold at said binarizing step, of a G-piece of multivalue data of a pixel of an image belonging to the character region, the image being mode designated as a full color document, and outputs the same binarized version to said first, second and third memory means.

36. An image filing method according to claim 34, wherein said selecting step selects the result of simple binarization, with a predetermined threshold at said binarizing step, of a G-piece of multivalue data of a pixel of an image belonging to the character region, said image being mode-designated as a document which contains a monochromatic region and a color region, outputs the binarized version to said first memory means and outputs "0" to said second and third memory means.

37. An image filing method according to claim 36, including a step of storing in a fourth memory means the result of the identification by said color/monochrome identifying step for an image being mode-designated as a document which contains a monochromatic region and a color region.

38. An image filing apparatus comprising:

input means for inputting as multivalue data an image corresponding to a document to the apparatus;

input data converting means for converting said multivalue data to binary data, said input converting means comprising;

region determining means having at least color identifying means for extracting a region of pixels to be expressed in a particular color contained in said image from said multivalue data;

binarizing means for binarizing luminance data of said image inclusive of said region of pixels to be expressed in said particular color from said multivalue data, and selection means for selecting the output of said binarizing means in accordance with the output of said region determining means;

image memory means for storing said binary data temporarily, said image memory means comprising:

first memory means for storing as a first plane said binarized luminance data (Y: Gc/Gd) inclusive of said region of pixels to be expressed in the particular color, and second memory means for storing as a second plane said binarized luminance data of said region of pixels to be expressed in said particular color.

39. An image filing apparatus according to claim 38, wherein said binarizing means includes binarizing processing means for binarizing said multivalue data with a predetermined threshold and dithering means for subjecting said multivalue data to pseudo-halftone processing and binarizing the result of their pseudo-halftone processing.

40. An image fling apparatus according to claim 39, wherein said region determining means including character/photograph region determining means for determining which of a character region and a photograph region each of portions of said image belongs to; and said selection means selects one of the outputs of said binarizing means and the output of said dithering means as said luminance data stored as the first plane in accordance with the output of said character/photograph determining means.

41. An image filing apparatus according to claim 40, wherein said selection means selects one of the outputs of said binarizing means and said dithering means as said luminance data to be stored as the second plane for the region of said pixel to be expressed in said particular color in accordance with the output of said character/- photograph region determining means, and selects "0" for regions other than said pixel to be expressed in said particular color irrespective of said output of the character/photograph region determining means.

42. An image filing apparatus according to claim 38, wherein said color identifying means comprises:

particular color pixel extracting means for receiving three kinds of R-, G- and B- pieces of multivalue data as said multivalue data and determining whether a relevant pixel is a pixel to be expressed in said particular color form the relative relationship between the values of R (red)-, G (green)-, B (blue)-pieces of multivalue data; and ghost removing means for rewriting the result of said determination on the relevant pixel on the basis of a combination of the result of the determination by said particular color pixel extracting means on pixels in the vicinity of each relevant pixel and said binary luminance data obtained from said binarizing means.

43. An image filing apparatus comprising:

input means for inputting as multivalue data an image corresponding to a document to said apparatus;

input data converting means for converting said multivalue data to binary data, said input data converting means comprising:

region determining means, having at least color identifying means, for extracting a region of pixels to be expressed in a particular color contained in the image from said multivalue data, binarizing means for binarizing luminance data of said image inclusive of said region of pixels to be expressed in said particular color from said multivalue data, and selection means for selecting the output of said binarizing means in accordance with the output of said region determining means;

image memory means for storing the binary data temporarily, said image memory means comprising:

first memory means for storing as a first plane said binarized luminance data (Y: Gc/Dg) inclusive of said region of pixels to be expressed in said particular color, and second memory means for storing as a second plane said binarized luminance data of said region of pixels to be expressed in said particular color; and image storing means for encoding and storing said binary data stored in said image memory means, decoding the stored data in a decoded data and outputting the decoded data to said image memory means.

44. An image filing apparatus according to claim 43, wherein said image storage means includes data storage for storing data in said first and second planes in the order in which the data in said first plane can be read first when required.

* * * * *